(12) United States Patent
Miyata et al.

(10) Patent No.: US 10,935,843 B2
(45) Date of Patent: Mar. 2, 2021

(54) BACKLIGHT AND DISPLAY DEVICE PROVIDED WITH SAME

(71) Applicant: SHARP KABUSHIKI KAISHA, Sakai (JP)

(72) Inventors: Hidekazu Miyata, Sakai (JP); Naoto Inoue, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/752,414

(22) Filed: Jan. 24, 2020

(65) Prior Publication Data

US 2020/0257167 A1    Aug. 13, 2020

Related U.S. Application Data

(60) Provisional application No. 62/803,252, filed on Feb. 8, 2019.

(51) Int. Cl.
*G02F 1/13357* (2006.01)
*G09G 3/34* (2006.01)

(52) U.S. Cl.
CPC ..... *G02F 1/133603* (2013.01); *G09G 3/3413* (2013.01); *G09G 3/3426* (2013.01); *G02F 2001/133612* (2013.01)

(58) Field of Classification Search
CPC ... G02F 1/133603; G02F 2001/133612; G02F 2001/133613; G09G 3/3413; G09G 3/3426; G09G 3/342; G09G 3/3406; F21V 23/003; F21V 23/004; F21V 23/005; F21V 23/006; F21V 23/04
See application file for complete search history.

(56) References Cited

U.S. PATENT DOCUMENTS 8,310,437 B2 * 11/2012 Maruyama ........... G09G 3/3426
                                                      345/102
2003/0227278 A1   12/2003  Sakuragi
2010/0134406 A1    6/2010  Maruyama et al.
2010/0309194 A1   12/2010  Shin et al.
(Continued)

FOREIGN PATENT DOCUMENTS

JP    2000-112422 A    4/2000
JP    2004-046088 A    2/2004
JP    2010-153359 A    7/2010
(Continued)

*Primary Examiner* — Bao Q Truong

(74) *Attorney, Agent, or Firm* — ScienBiziP, P.C.

(57) ABSTRACT

A backlight is configured by a power supply switching circuit configured to switch a supply destination of a power source voltage for LED driving among a plurality of blocks, a plurality of power source lines which are provided in one-to-one correspondence with the plurality of blocks and are each connected to an upstream end of each of LED units included in a corresponding block, an LED drive circuit including the same number of turn-on control switches, which are for controlling whether to supply a current to LEDs, as LED units included in each block, and one or more discharge control circuits provided for each block. The discharge control circuit lowers a voltage level at the upstream end of each of LED snits included in a corresponding block after an end of a period in which the power source voltage is supplied to the corresponding block.

9 Claims, 30 Drawing Sheets

(56) References Cited

U.S. PATENT DOCUMENTS

2011/0175894 A1* 7/2011 Wakimoto .......... G02F 1/13306
   345/212
2015/0206484 A1   7/2015 Gotoh

FOREIGN PATENT DOCUMENTS

JP   2010-282197 A   12/2010
JP   2014-026006 A   2/2014

* cited by examiner

BACKLIGHT AND DISPLAY DEVICE PROVIDED WITH SAME

CROSS REFERENCE TO RELATED APPLICATIONS

This application claims priority to U.S. Provisional Patent Application No. 62/803,252, entitled "BACKLIGHT AND DISPLAY DEVICE PROVIDED WITH SAME", filed on Feb. 8, 2019, the content of which is incorporated herein by reference.

BACKGROUND OF THE INVENTION

1. Field of the Invention

The following disclosure relates to a backlight including LEDs as light sources, and a display device including the backlight.

2. Description of Related Art

A transmissive type liquid crystal display device requires, in order to display images, backlight that emits light to a display portion (liquid crystal panel) from its back surface. Conventionally, as a light source of the backlight, a cold-cathode tube referred to as a CCFL has been widely used. However, in recent years, an LED (light-emitting diode) has become widely employed due to low power consumption and facilitation of luminance control.

Regarding the liquid crystal display device, in order to decrease power consumption, a technology called "local dimming" has been developed in which a screen is logically divided into a plurality of areas, and luminance (light emission intensity) of LED is controlled for each of the areas. According to the local dimming, the luminance of each of the LEDs is determined based on, for example, a maximum value, an average value, and the like of input gradation values of pixels included in a corresponding area. In this manner, each of the LEDs emits light with luminance depending on an input image for the corresponding area.

Further, in recent years, a technology called "HDR" that realizes an extremely wide dynamic range has been introduced more widely. While maximum luminance of displaying according to the conventional signal transmission is defined to be 100 nits, maximum luminance according to the HDR standard is defined to be a range from 1000 nits to 10000 nits. A specification (standard) for a liquid crystal display device is also determined corresponding to the HDR. Specifically, the liquid crystal display device adapting to the HDR is required to satisfy the following standard so that a contrast ratio at "20000:1" is achieved.

Maximum luminance: 1000 nits or higher

Black luminance: 0.05 nits or lower

In order to satisfy this standard, the local dimming described above is employed for the liquid crystal display device adapting to the HDR.

FIG. 22 is a schematic diagram of a direct-type backlight employing the local dimming. This backlight includes an LED driver substrate 910 and an LED substrate 920. The LED substrate 920 is logically divided into a plurality of areas (in FIG. 22, 16 areas), and one or more LEDs 922 are mounted as a light source on each of the areas. As schematically shown in FIG. 23, on the LED driver substrate 910 and the LED substrate 920, control signal lines for driving LEDs 922 are provided for the respective areas. In the example shown in FIG. 23, a constant current source 9122 and a switch 9124 for controlling an amount of current are provided for each area. In addition, in the example shown in FIG. 23, one LED drive circuit (IC) 912 including four constant current source 9122 and four switch 9124 is provided for each four area. Luminance of the LED 922 is controlled for each of areas by associating one output of the LED drive circuit 912 with one area.

Now, a dimming control method for LEDs will be described. Examples of the dimming control method mainly include an analog dimming control method for controlling luminance by changing a magnitude of currents flowing through the LEDs, and a PWM dimming control method for controlling luminance by changing lighting time of the LEDs. In brief, dimming control according to the analog dimming control method corresponds to changing a current value of the constant current source 9122 shown in FIG. 23, and dimming control according to the PWM dimming control method corresponds to varying ratio of time in an ON state and an OFF state of the switch 9124 shown in FIG. 23. According to the analog dimming control method, as shown in FIG. 24, lighting time of the LEDs is assumed to be constant, and the luminance of the LEDs is controlled by changing the magnitude of currents flowing through the LEDs as described above. According to the PWM dimming control method, as shown in FIG. 25, a magnitude of currents flowing through the LEDs is assumed to be constant, and the luminance of the LEDs is controlled by changing the lighting time of the LEDs as described above.

Further, examples of an approach of the dimming control for backlight for liquid crystal display include an LD dimming control for controlling the LEDs so as to obtain luminance depending on an input image for each area and for each frame, and a maximum display luminance dimming control for controlling luminance of the LEDs depending on target luminance for an entire screen. Either of these two approaches may be employed in combination with the analog dimming control method or the PWM dimming control method. However, according to the analog dimming control method, as relationship between the current flowing through the LED and the luminance of the LED is non-linear, it is difficult to perform control to obtain luminance with desired accuracy. In addition, the analog dimming control method poses another problem that chromaticity may change depending on the current value. Therefore, in many cases in recent years, for either of the LD dimming control and the maximum display luminance dimming control, it is employed in combination with the PWM dimming control method with which the current value is constant.

Meanwhile, in recent years, development of microscopic LEDs (such as LEDs called "mini-LEDs" and LEDs called "micro-LEDs") as compared to the conventional LEDs has become more active. It is expected that the number of area divisions when performing the local dimming is increased so as to enhance display quality by adopting a backlight using such microscopic LEDs. Regarding this, it is difficult to implement a method of driving the LED on an area-by-area basis by the configuration as shown in FIG. 23 due to reasons such as an enormous number of wiring lines being required. Therefore, Japanese Laid-Open Patent Publication No. 2010-153359 discloses a method called "passive driving (time-division driving)" in which LEDs 922 mounted on the LED substrate 920 are divided into a plurality of blocks and the LEDs 922 are driven time-divisionally and on a block-by-block basis. It should be noted that a technique regarding the passive driving is described in Japanese Laid-Open Patent Publication No. 2014-26006 and Japanese Laid-Open Patent Publication No. 2010-282197, for example.

FIG. 26 is a schematic circuit diagram showing a configuration example of a backlight that performs the passive driving. It should be noted that, here, we focus on a case in which there are 16 (four vertical×four horizontal) areas and one LED 952 is provided in each area. The backlight shown in FIG. 26 includes an LED drive circuit 930, a power supply switching circuit 940, an illuminating unit 950, and an LED power source 960. The LED power source 960 supplies a power source voltage for turning on the LEDs 952. The LED drive circuit 930 has four outputs, and a constant current source 932 and a switch 934 are provided for each output. In the illuminating unit 950, one LED 952 is provided for each area. One row in the illuminating unit 950 in FIG. 26 corresponds to one block. Namely, there are four blocks in this example.

In the configuration such as described above, the power supply switching circuit 940 time-divisionally switches the supply destination of the power source voltage among the four blocks in each frame period. That is, in the passive driving, one frame period is divided into a plurality of subframe periods, and during each subframe period, LEDs in a corresponding block (row) are turned on. In this example, one frame period is divided into four subframe periods T91 to T94 as shown in FIG. 27, and turn-on of the LEDs 952 is performed on a block-by-block basis. It should be noted that, in actuality, driving unit of the LEDs in a case in which one frame period is divided into a plurality of subframe periods is not limited to the row-by-row basis. There is a case in which the LEDs are driven on a plural-row-by-plural-row basis, and there is also a case in which the LEDs are driven for each area after being divided into left and right, for example. An increase in the number of area divisions is tried by adopting the passive driving as described above.

However, in a case in which the passive driving is adopted, such a phenomenon that an LED which should not be turned on is slightly turned on (hereinafter referred to as an "erroneous lighting") may occur. This will be described in detail below.

Here, we focus on a case in which 126 (nine vertical× fourteen horizontal) LEDs are provided in the illuminating unit in one-to-one correspondence with 126 areas as shown in FIG. 28. It is assumed that one row corresponds to one block and that one output of the LED drive circuit is connected to the LEDs for one column. In addition, it is assumed that the LEDs are driven on a block-by-block basis (on a row-by-row basis) from an upper part of FIG. 28 to a lower part thereof. Under the above conditions, in a case in which driving is performed such that only a certain LED should be turned on and other LEDs should not be turned on, an LED disposed at the same column as an LED that is a lighting target and disposed at the upper side with respect to the LED that is a lighting target (an LED driven prior to an LED that is a lighting target) may be slightly turned on. For example, in a case in which only an LED of the sixth row and the eighth column is a lighting target, an LED of the fifth row and the eighth column and an LED of the fourth row and the eighth column may be slightly turned on (see FIG. 28).

The reason why such an erroneous lighting occurs is as follows. In the power supply switching circuit 940 that constitutes the backlight, a switch 942 is provided for each block, as shown in FIG. 29. Here, it is assumed that the switch 942 is in the ON state when the control signal S supplied to the switch 942 is at a high level. For example, when the control signal D6 is at the high level, the switch 942 corresponding to the sixth row is in the ON state, and the power source voltage is supplied to the power source line PL6 in the block of the sixth row. Thus, the LEDs 952 included in the block of the sixth row can be turned on. It is assumed that a switch 934 included in the LED drive circuit 930 is in the ON state when the control signal supplied to the switch 934 is at the high level.

In this example, the control signals D1 to D9 having waveforms shown in FIG. 30 are respectively supplied to the switches 942 corresponding to the first to ninth rows. As a result, to the nine blocks, supply of the power source voltage to the power source line PL is performed on a block-by-block basis. In a case in which the PWM dimming control method is adopted, luminance of each LED 952 is controlled by adjusting ratio of time in an ON state and an OFF state of the switch 934 (see FIG. 29) in the corresponding column. Lighting state as shown in FIG. 28 occurs when driving is performed such that "in a drive period T96 for a block of the sixth row, only the control signal S8 supplied to the switch 934 of the eighth column becomes the high level, and in other periods, the control signals S1 to S14 are maintained at a low level" (see FIG. 31). It should be noted that, in the example shown in FIG. 31, since the control signal S8 is maintained at the high level during the drive period T96, the LED 952 of the sixth row and the eighth column is turned on with the maximum luminance. If the LED 952 of the sixth row and the eighth column should be turned on with half the maximum luminance, the control signal S8 is maintained at the high level during half the drive period T96.

In the example described above, the voltages V (PL4) to V (PL7) of the power source lines PL4 to PL7 of the fourth to seventh rows (in other words, anode voltages of the LEDs 952 connected to the power source lines PL4 to PL7 of the fourth to seventh rows) change as shown in a portion given reference character 9 in FIG. 32. As shown in FIG. 32, the voltage of each power source line increases when the control signal supplied to the corresponding switch 942 changes from the low level to the high level and decreases when the control signal supplied to the corresponding switch 942 changes from the high level to the low level.

In the drive period T96 for the block of the sixth row, since only the control signal S8 among the control signals S1 to S14 becomes the high level as described above, the power source voltage is supplied to the anode of the LED 952 of the sixth row and the eighth column in a state in which the cathode of the LED 952 is connected to the constant current source 932. As a result, the LED 952 of the sixth row and the eighth column is turned on. In the meantime, in the drive period T95 for the block of the fifth row, since the control signal D5 becomes the high level, the voltage V (PL5) of the power source line PL5 of the fifth row increases. In the drive period T95, since the control signal S8 is maintained at the low level, the LED 952 of the fifth row and the eighth column is not turned on. The voltage V (PL5) of the power source line PL5 that has increased in the drive period T95 starts to decrease when the drive period T96 comes. However, the voltage V (PL5) decreases only little by little. Therefore, in the drive period T96, the anode voltage of the LED 952 of the fifth row and the eighth column is higher than the usual voltage. As a result, in the drive period T96, the current flows through also the LED 952 of the fifth row and the eighth column, and the LED 952 is slightly turned on. In addition, when the voltage of the power source line gradually decreases, in some cases, the voltage V (PL4) of the power source line PL4 of the fourth row has not decreased sufficiently even in the drive period T96. In this case, in the drive period T96, the current flows through also the LED 952 of the fourth row and the eighth column, and the LED 952 is slightly turned on. In this way, the erroneous lighting occurs.

In the meantime, the circuit including the LED 952 that is separated from the LED power source 960 by the power supply switching circuit 940 is, from the viewpoint of the equivalent circuit, a circuit in which a capacitor and a resistor are connected in parallel. In this case, although electric charge is discharged depending on a time constant, the voltage decreases little by little since the resistance is small in such a circuit. Accordingly, after end of the drive period, the voltage of the corresponding power source line does not decrease rapidly. As a result, the erroneous lighting occurs.

Japanese Laid-Open Patent Publication No. 2000-112422 discloses a technique that prevents the above erroneous lighting from occurring. According to the technique, in order to prevent the erroneous lighting from occurring, an OFF period is provided between two drive periods which are continuing temporally. However, in a case in which the number of area divisions is extremely large, the OFF period having a sufficient length cannot be provided, and therefore the erroneous lighting may occur.

In addition, Japanese Laid-Open Patent Publication No. 2004-46088 also discloses a technique that prevents the erroneous lighting from occurring. According to the technique, an erroneous lighting prevention circuit having a discharge path for discharging a residual electric charge from a charging element to a ground terminal during driving is provided in the LED display device. Thus, in a case in which one LED should not be turned on in a lighting allowable period for the LED, lighting of the LED due to the residual electric charge is prevented. However, in a lighting allowable period for one LED, it is not possible to prevent lighting of other LED (an LED that should not be turned on) due to the residual electric charge. This will be described below with reference to FIG. 33 (FIG. 2 of Japanese Laid-Open Patent Publication No. 2004-46088) and FIG. 34 (FIG. 6 of Japanese Laid-Open Patent Publication No. 2004-46088).

In regard to the configuration. shown in FIG. 33, the light-emitting diode L1 and the light-emitting diode L2 are connected to the driver IC with a common line. When the switching element (P-channel type FET) Q1 becomes an ON state, the light-emitting diode L1 is turned on based on the operation of the driver IC. When the switching element (P-channel type FET) Q2 becomes an ON state, the light-emitting diode L2 is turned on based on the operation of the driver IC.

As grasped from FIG. 34, the gate voltage of the switching element Q1 is at the low level during a period during which the light-emitting diode L1 is in the driving state (a period during which the anode voltage of the light-emitting diode L1 is 5V). Accordingly, during this period, the voltage at a connection point of the resistor R2 and the resistor R3 is at the low level. By this, electric charge of the capacitor C1 is discharged through the discharge path. If the erroneous lighting prevention circuit is not provided, then charging/discharging of the capacitor C1 does not occur during the period. As a result, during the period, even when the light-emitting diode L1 should be maintained at a non-lighting state, the light-emitting diode L1 is turned on due to the residual electric charge. IF the erroneous lighting prevention circuit is provided, then such an erroneous lighting is prevented from occurrence. However, since the capacitor C1 is provided in the erroneous lighting prevention circuit, the anode voltage of the light-emitting diode L1 does not decrease rapidly after end of the lighting allowable period for the light-emitting diode L1. Therefore, the erroneous lighting of the light-emitting diode L1 may occur during a period during which the light-emitting diode L2 is in the driving state.

As described above, in a case in which the passive driving is adopted, the erroneous lighting (the phenomenon that an LED which should not be turned on is slightly turned on) may occur.

SUMMARY OF THE INVENTION

Thus, an object of the following disclosure is to implement a backlight that can perform the passive driving (time-division driving) of LEDs without causing erroneous lighting of LEDs, and a display device including the backlight. In order to achieve the above object, the present invention has features as shown below.

(1) Backlights according to several embodiments of the present invention are each a backlight including LEDs as light sources, the backlight including:

a plurality of LED units divided into a plurality of blocks, each of the plurality of LED units including one or more LEDs, a power supply switching circuit configured to switch a supply destination of a power source voltage for LED driving among the plurality of blocks such that the plurality of LED units are driven on a block-by-block basis, a plurality of power source lines for supplying the power source voltage, the plurality of power source lines being provided in one-to-one correspondence with the plurality of blocks, and each of the plurality of power source lines being connected to an upstream end of each of LED units included in a corresponding block, an LED drive circuit including the same number of turn-on control switches as LED units included in each block, each of the turn-on control switches being configured to control whether to supply a current to LEDs constituting corresponding LED units, and one or more discharge control circuits provided for each block, each of the one or more discharge control circuits being configured to lower a voltage level at the upstream end of each of LED units included in a corresponding block after an end of a period in which the power source voltage is supplied to the corresponding block.

According to such a configuration, in the backlight that performs the passive driving (time-division driving), one or more discharge control circuits are provided for each block. The discharge control circuit lowers a voltage level at an upstream end (an anode of a LED disposed at the most upstream side) of a LED unit (one or more LED provided for each area) included in a corresponding block after an end of a period in which the power source voltage for LED driving is supplied to the corresponding block. Namely, after end of a lighting allowable period (a period in which the power source voltage is supplied) for each block, a voltage level at an upstream end of a LED unit included in the corresponding block can be rapidly decreased. Thus, the erroneous lighting of the LEDs that has conventionally occurred is prevented from occurrence. As above, it is possible to implement a backlight that can perform the passive driving of LEDs without causing erroneous lighting.

(2) Moreover, backlights according to several embodiments of the present invention are each a backlight including the configuration of above (1), wherein only one discharge control circuit is provided for each block,
each discharge control circuit includes a discharge control switch having a control terminal to which a first control signal is supplied, a first conduction terminal connected to a corresponding power source line, and a second conduction terminal grounded electrically, and
the power supply switching circuit includes, for each block, a power source supply control switch having a control terminal to which a second control signal is supplied, a first conduction terminal to which the power source voltage is supplied, and a second conduction terminal connected to a corresponding power source line.

(3) Moreover, backlights according to several embodiments of the present invention are each a backlight including the configuration of above (2), wherein
regarding two blocks driven in succession, when a block driven earlier s defined as a preceding block and a block driven later is defined as a succeeding block, the discharge control switch included in a discharge control circuit corresponding to the preceding block becomes an ON state in a period from an end of a period in which the power source voltage is supplied to the preceding block to a start of a period in which the power source voltage is supplied to the succeeding block, based on the first control signal.

(4) Moreover, backlights according to several embodiments of the present invention are each a backlight including the configuration of above (2), wherein
a logical inversion signal of the second control signal is supplied as the first control signal to the control terminal of the discharge control switch.

(5) Moreover, backlights according to several embodiments of the present invention are each a backlight including the configuration of above (1), wherein
only one discharge control circuit is provided for each block,
each discharge control circuit includes
a discharge control switch having a control terminal to which a first control signal is supplied, a first conduction terminal to which the power source voltage is supplied, and a second conduction terminal grounded through a resistor, and
a diode having an anode connected to a corresponding power source line and a cathode connected to the second conduction terminal of the discharge control switch,
the power supply switching circuit includes, for each block, a power source supply control switch having a control terminal to which a second control signal is supplied, a first conduction terminal to which the power source voltage is supplied, and a second conduction terminal connected to a corresponding power source line, and
the first control signal and the second control signal are the same signal.

(6) Moreover, backlights according to several embodiments of the present invention are each a backlight including the configuration of above (1), wherein
a plurality of the discharge control circuits are provided in one-to-one correspondence with the plurality of LED units, and
each discharge control circuit includes a discharge control switch having a control terminal to which a first control signal is supplied, a first conduction terminal connected to a corresponding power source line, and a second conduction terminal connected to a downstream end of a corresponding LED unit.

(7) Moreover, backlights according to several embodiments of the present invention are each a backlight including the configuration of above (6), wherein
regarding two blocks driven in succession, when a block driven earlier is defined as a preceding block and a block driven later is defined as a succeeding block, the discharge control switch included in a discharge control circuit corresponding: to a LED unit included in the preceding block becomes an ON state in a period from an end of a period in which the power source voltage is supplied to the preceding block to a start of a period in which the power source voltage is supplied to the succeeding block, based on the first control signal.

(8) Moreover, backlights according to several embodiments of the present invention are each a backlight including the configuration of above (6), wherein
the same signal is supplied as the first control signal to the control terminal of each of all discharge control switches, and
the all discharge control switches become an ON state in a period from an end of a period in which the power source voltage is supplied to each block to a start of a period in which the power source voltage is supplied to another block, based on the same signal.

(9) Moreover, display devices according to several embodiments of the present invention are each a display device including:
a display panel having a display portion configured to display an image, and
the backlight including the configuration of any one of above (1) to (8), the backlight being disposed on a back surface of the display panel so as to emit light to the display portion.

These and other objects, features, aspects, and effects of the present invention will be made clearer from the following detailed description of the present invention with reference to the accompanying drawings.

DETAILED DESCRIPTION OF PREFERRED EMBODIMENTS

Embodiments will be described below with reference to the accompanying drawings. It should be noted that only differences from the first embodiment will be mainly described in regard to second to fourth embodiments.

1. First Embodiment

<1.1 Overall Configuration and Operation Outline>

Figure 2:
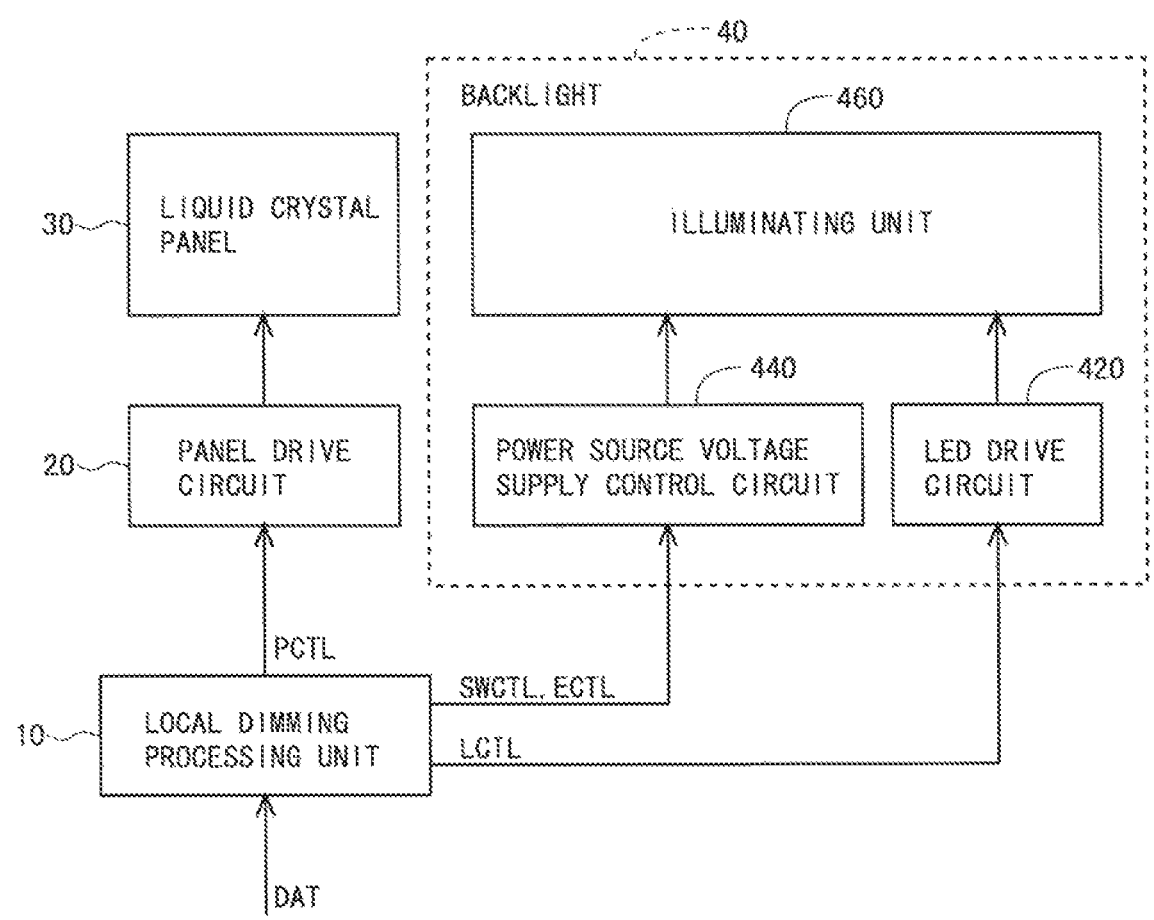
FIG. 2 is a block diagram showing an overall configuration of a liquid crystal display device in the first embodiment.

FIG. 2 is a block diagram showing an overall configuration of a liquid crystal display device according to a first embodiment. The liquid crystal display device includes a local dimming processing unit 10, a panel drive circuit 20, a liquid crystal panel 30, and a backlight 40. The liquid crystal panel 30 is formed by two glass substrates facing each other and includes a display port that displays an image. The backlight 40 is provided on the back of the liquid crystal panel 30. The backlight 40 includes an LED drive circuit 420, a power source voltage supply control circuit 440, and an illuminating unit 460. The illuminating unit 460 includes a plurality of LEDs which are provided on a substrate (an LED substrate). Regarding this, the LED substrate is logically divided into a plurality of areas, and one LED is mounted on the LED substrate for each area. However, in some cases, a plurality of LEDs are mounted on the LED substrate for each area. The LED drive circuit 420 and the power source voltage supply control circuit 440 are typically provided on the same substrate. The local dimming processing unit 10, the panel drive circuit 20, and the LED drive circuit 420 are typically provided on different substrates. It should be noted that the LED power source is omitted in FIG. 2.

Figure 3:
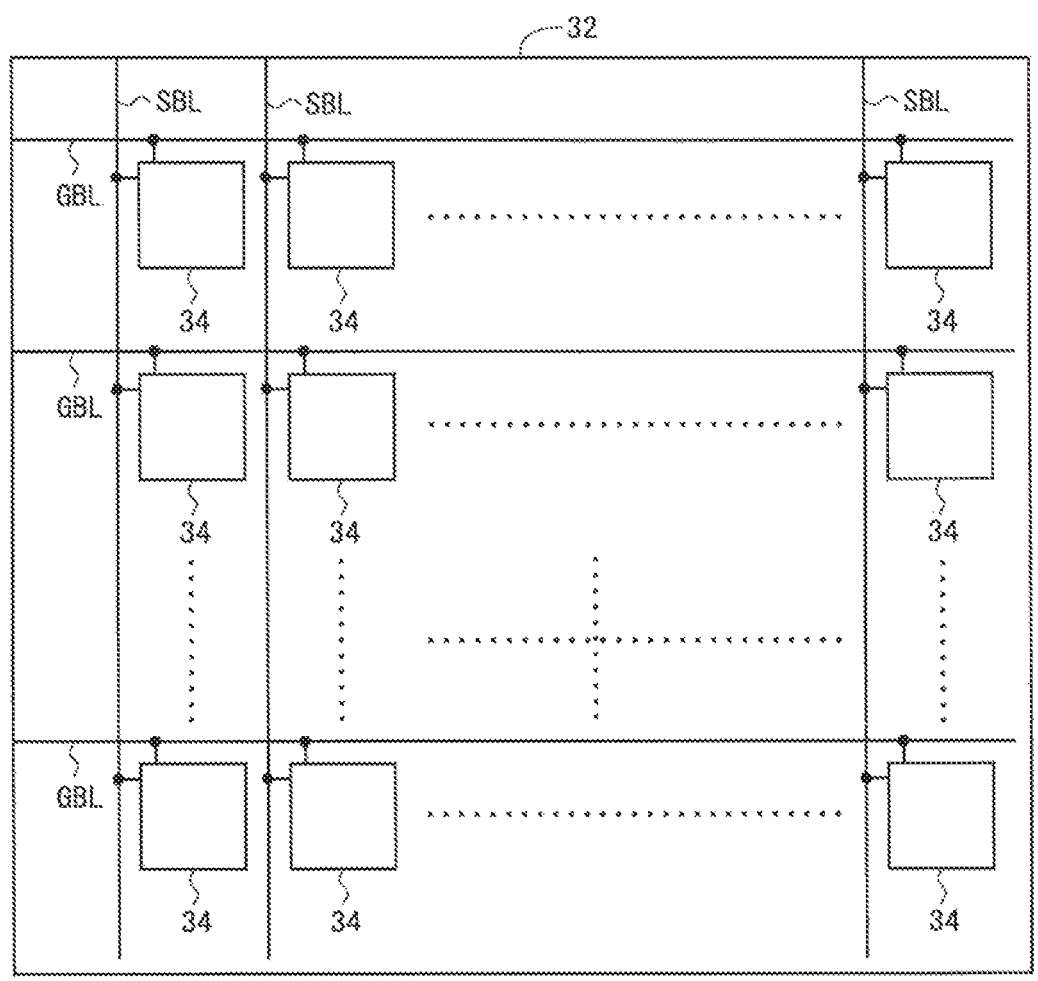
FIG. 3 is a diagram for describing a configuration of a display portion in the first embodiment.

In the display portion 32 in the liquid crystal panel 30, as shown in FIG. 3, a plurality of gate bus lines GBL and a plurality of source bus lines SBL are disposed. Pixel portions 34 are provided at the respective intersections of the plurality of gate bus lines GBL and the plurality of source bus lines SBL. That is, the display portion 32 includes a plurality of pixel portions 34. The plurality of pixel portions 34 are arranged in a matrix form, forming a pixel matrix. Each pixel portion 34 includes a pixel capacitance.

The operation of the components shown in FIG. 2 will be described. The local dimming processing unit 10 receives image data DAT transmitted from an external source, and outputs a panel control signal PCTL for controlling the operation of the panel drive circuit 20, a luminance control signal LCTL for controlling the operation of the LED drive circuit 420, and a switching control signal SWCTL and a discharge control signal ECTL which are for controlling the operation of the power source voltage supply control circuit 440 so as to perform the above-described local dimming (a process of controlling the luminances of the LEDs on an area-by-area basis). It should be noted that each of the panel control signal PCTL, the luminance control signal LCTL, the switching control signal SWCTL, and the discharge control signal ECTL includes a plurality of control signals.

The panel drive circuit 20 drives the liquid crystal panel 30 based on the panel control signal PCTL transmitted from the local dimming processing unit 10. Specifically, the panel drive circuit 20 includes a gate driver that drives the gate bus lines GBL and a source driver that drives the source bus lines SBL. By the gate driver driving the gate bus lines GBL and the source driver driving the source bus lines SBL, a voltage determined based on a target display image is written to the pixel capacitance in each pixel portion 34.

The LED drive circuit 420 controls the luminance of each LED in the illuminating unit 460 based on the luminance control signal LCTL transmitted from the local dimming processing unit 10. The power source voltage supply control circuit 440 time-divisionally switches the supply destination of the power source voltage among a plurality of blocks in each frame period. It should be noted that, since four blocks exist in the present embodiment as described below, the power source voltage supply control circuit 440 time-divisionally switches the supply destination of the power source voltage among four blocks in each frame period based on the switching control signal SWCTL transmitted from the local dimming processing unit 10. In addition, the power source voltage supply control circuit 440 has a function of lowering an anode voltage of the LED after end of a drive period based on the discharge control signal ECTL transmitted from the local dimming processing unit 10 in order to prevent the above-described erroneous lighting from occurrence.

One LED is provided for each area in the illuminating unit 460 as described above, and each LED emits light at a desired luminance based on the control by the LED drive circuit 420 and the power source voltage supply control circuit 440. In this manner, the illuminating unit 460 irradiates the display portion 32 with light from the back of the display portion 32.

In the above-described manner, the illuminating unit 460 in the backlight 40 irradiates the display portion 32 with light from the back of the display portion 32, with a voltage, which is determined based on a target display image, written to the pixel capacitance in each pixel portion 34 provided in the display portion 32 of the liquid crystal panel 30, by which a desired image is displayed on the display portion 32.

<1.2 Backlight>
<1.2.1 Configuration>

Figure 4:
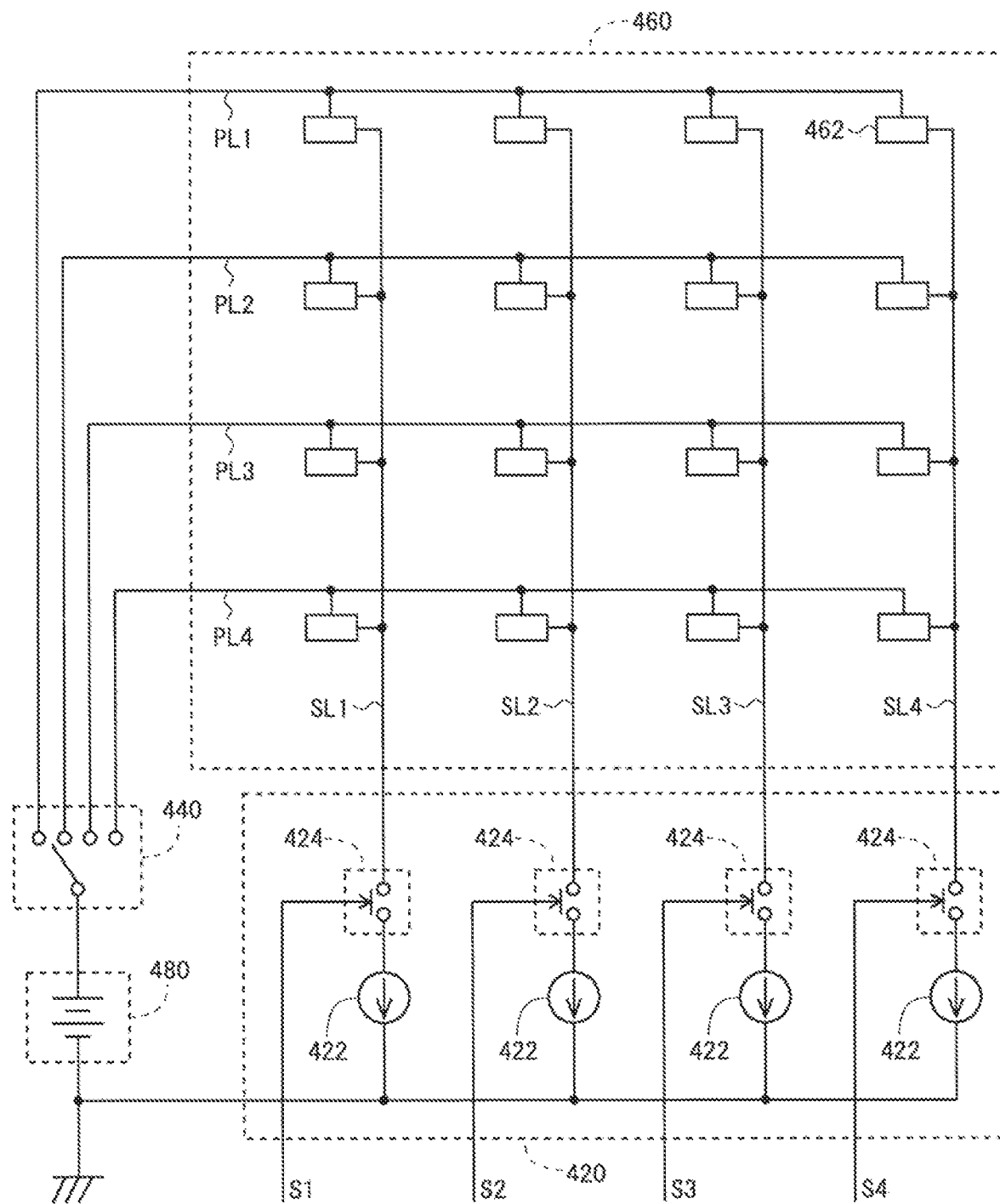
FIG. 4 is a schematic circuit diagram for describing a configuration of a backlight in the first embodiment.

FIG. 4 is a schematic circuit diagram for describing a configuration of the backlight 40. As shown in FIG. 4, the backlight 40 includes the LED drive circuit 420, the power source voltage supply control circuit 440, the illuminating unit 460, and an LED power source 480. In the following, it is assumed that the substrate (LED substrate) that constitutes the illuminating unit 460 is logically divided into 16 (four vertical×four horizontal) areas. However, the number of areas are contemplated to be equal or more than 1000 (for example, 1152 (24×48)). It should be noted that the LED substrate is implemented by a PCB, for example.

In the illuminating unit 460, four power source lines PL1 to PL4 extending in the horizontal direction in FIG. 4 and four turn-on control lines SL1 to SL4 extending in the vertical direction in FIG. 4 are disposed. Each of the intersections of the four power source lines PL1 to PL4 and the four turn-on control lines SL1 to SL4 corresponds to one area, and one LED 462 is provided for each one of the 16 areas. It should be noted that, when focusing on any one power source line, the focused power source line is given reference character PL. Likewise, when focusing on any one turn-on control line, the focused turn-on control line is given reference character SL. Regarding each LED 462, an anode is connected to a corresponding power source line PL and a cathode is connected to a corresponding turn-on control line SL.

Figure 5:
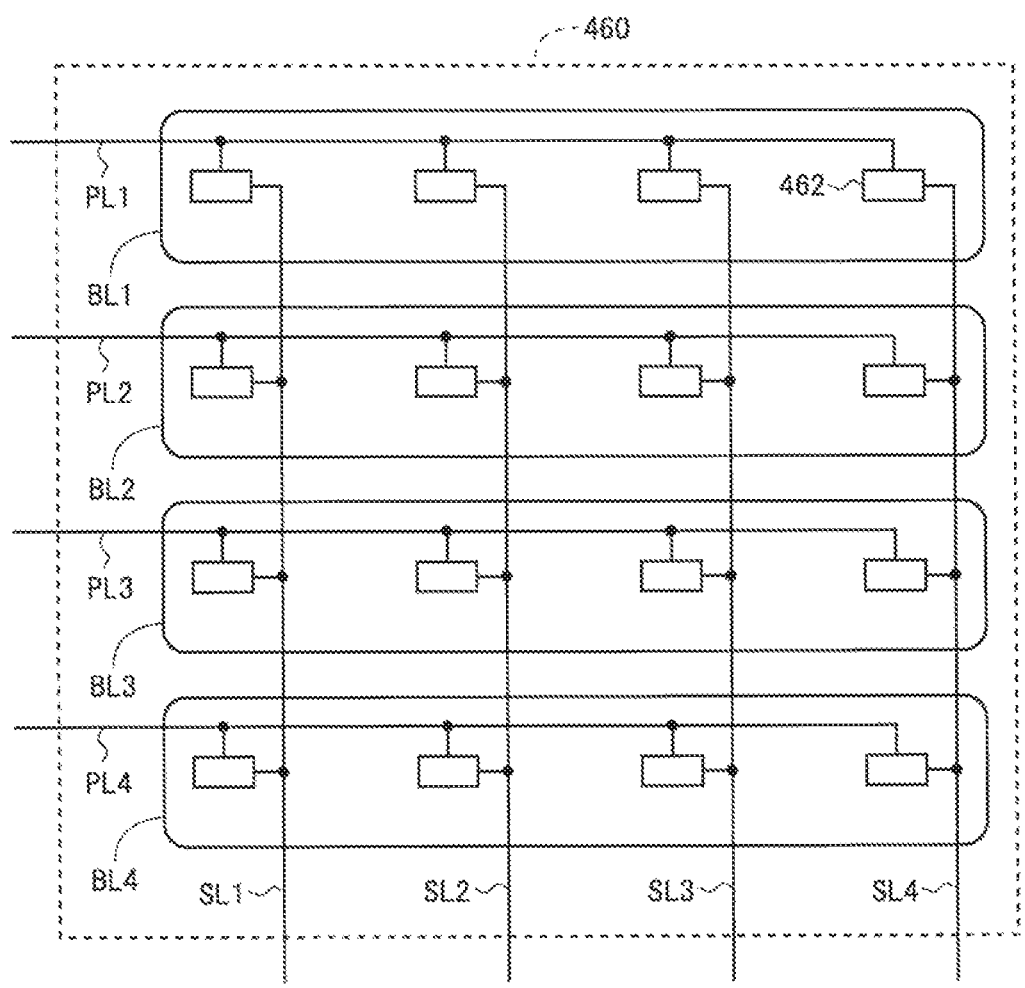
FIG. 5 is a diagram for describing blocks in the first embodiment.

In the meantime, the above-described passive driving (time-division driving) is performed in this backlight 40. Regarding this, here, it is assumed that the LEDs in the illuminating unit 460 are divided into four blocks (the first block BL1 to the fourth block BL4) as shown in FIG. 5. Further, it is assumed that driving (turning on the LEDs 462 in the block) is performed at the first block BL1, at the second block BL2, at the third block BL3, and at the fourth block BL4 in this order in each frame period. It should be noted that, as grasped from FIG. 5, four power source lines PL1 to PL4 are provided in one-to-one correspondence with the four blocks (the first block BL1 to the fourth block BL4). Each power source line PL is connected to the anode of each of the LEDs 462 included in a corresponding block.

The LED power source 480 supplies a power source voltage VLED for turning on the LEDs 462. A detailed description of the power source voltage supply control circuit 440 will be made later.

Four control signals SL1 to SL4 are supplied as the above-described luminance control signal LCTL to the LED drive circuit 420. It should be noted that, when focusing on one of the four control signals SL1 to SL4, the focused control signal is given reference character S. In the LED drive circuit 420, a constant current source 422 and a switch 424 are provided for each turn-on control line SL. The constant current source 422 functions such that the constant current flows through the turn-on control line SL. Regarding the switch 424, switching between an ON state and an OFF state is performed based on the control signal S. In the present embodiment, the switch 424 is in the ON state when the control signal S is at a high level, and the switch 424 is in the OFF state when the control signal S is at a low level. When the switch 424 is in the ON state, the constant current flows through a corresponding turn-on control line SL (however, it is assumed that the power source voltage VLED is supplied to any of the power source lines PL). When the switch 424 is in the OFF state, the constant current does not flow through the corresponding turn-on control line SL.

Figure 1:
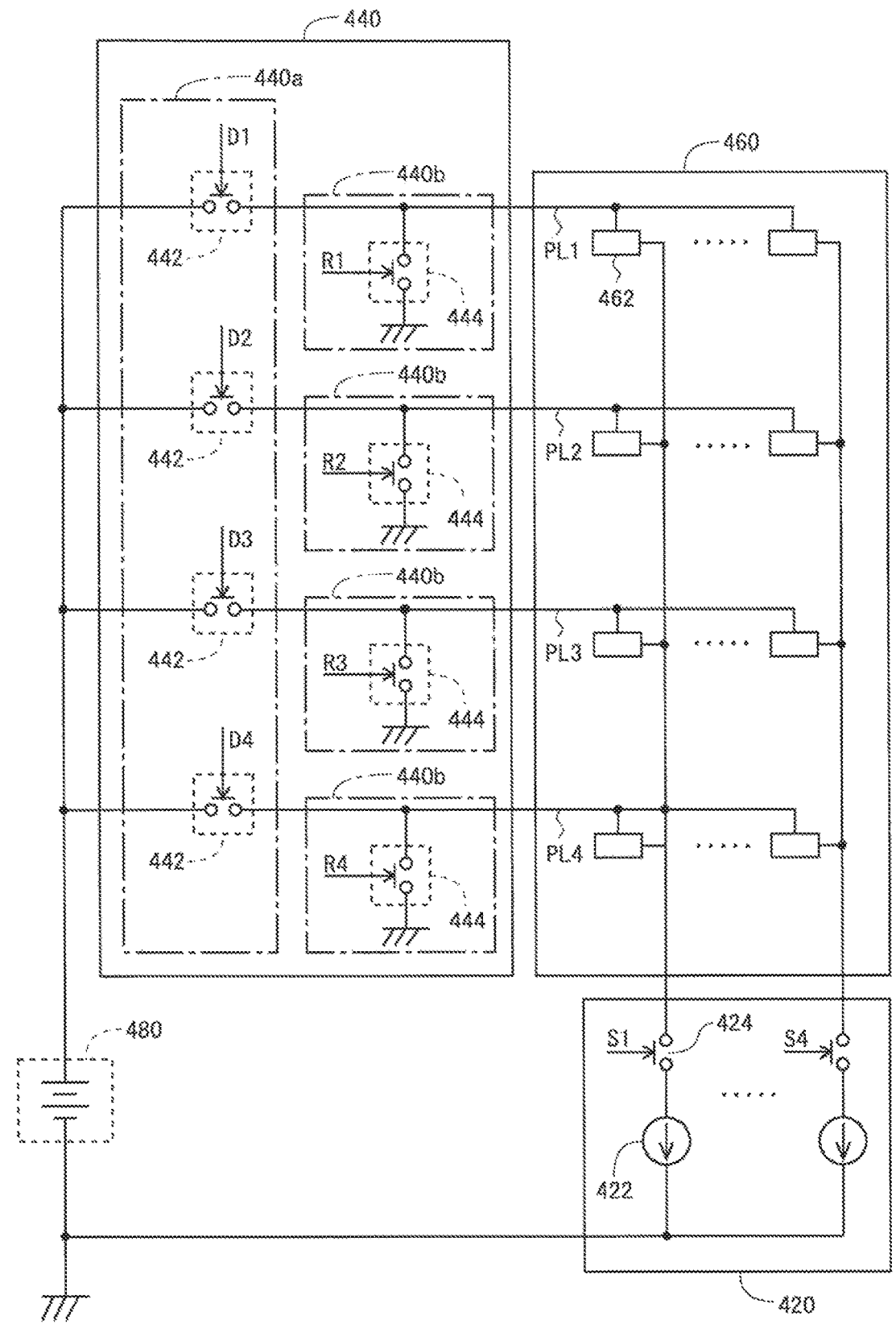
FIG. 1 is a circuit diagram for describing a detailed configuration of a power source voltage supply control circuit in a first embodiment.

FIG. 1 is a circuit diagram for describing a detailed configuration of the power source voltage supply control circuit 440. As shown in FIG. 1, the power source voltage supply control circuit 440 includes a part that functions as a power supply switching circuit 440a and a part that functions as a discharge control circuit 440b. It should be noted that the discharge control circuit 440b is provided for each block. To the power source voltage supply control circuit 440, four control signals D1 to D4 are supplied as the above-described switching control signal SWCTL and four control signals R1 to R4 are supplied as the discharge control signal ECTL. It should be noted that, when focusing on one of the four control signals D1 to D4, the focused control signal is given reference character D, and when focusing on one of the four control signals R1 to R4, the focused control signal is given reference character R.

The power supply switching circuit 440a time-divisionally switches the supply destination of the power source voltage VLED among the four blocks (the first block BL1 to the fourth block BL4) such that the plurality of LEDs 462 provided in the illuminating unit 460 are driven on a block-by-block basis. The discharge control circuit 440b lowers a voltage level at the anode of each of LEDs 462 included in a corresponding block after an end of a period in which the power source voltage VLED is supplied to the corresponding block. It should be noted that, as described above, in some cases, a plurality of LEDs are provided for each area. Thus, we define one or a plurality of LEDs provided in each area as an LED unit. Further, the number of blocks in not limited to four. In view of the above, the power supply switching circuit 440a switches the supply destination of the power source voltage VLED among the plurality of blocks such that the plurality of LED units are driven on a block-by-block basis. Further, the discharge control circuit 440b lowers a voltage level at an upstream end of each of LED units included in a corresponding block after an end of a period in which the power source voltage VLED is supplied to the corresponding block.

The power supply switching circuit 440a includes one switch 442 for each block. Each discharge control circuit 440b includes one switch 444. As above, two switches (the switch 442 and the switch 444) are provided for each power source line PL. Each of the switch 442 and the switch 444 is implemented by a transistor, foe example. Regarding the switch 442, switching between the ON state and the OFF state is performed based on the control signal D. In the present embodiment, the switch 442 is in the ON state when the control signal D is at the high level, and the switch 442 is in the OFF state when the control signal D is at the low level. Regarding the switch 444, switching between the ON state and the OFF state is performed based on the control signal R. In the present embodiment, the switch 444 is in the ON state when the control signal R is at the high level, and the switch 444 is in the OFF state when the control signal R is at the low level. When focusing on the four switches 442 in the power supply switching circuit 440a, only one switch 442 at a maximum is in the ON state in any period.

Figure 6:
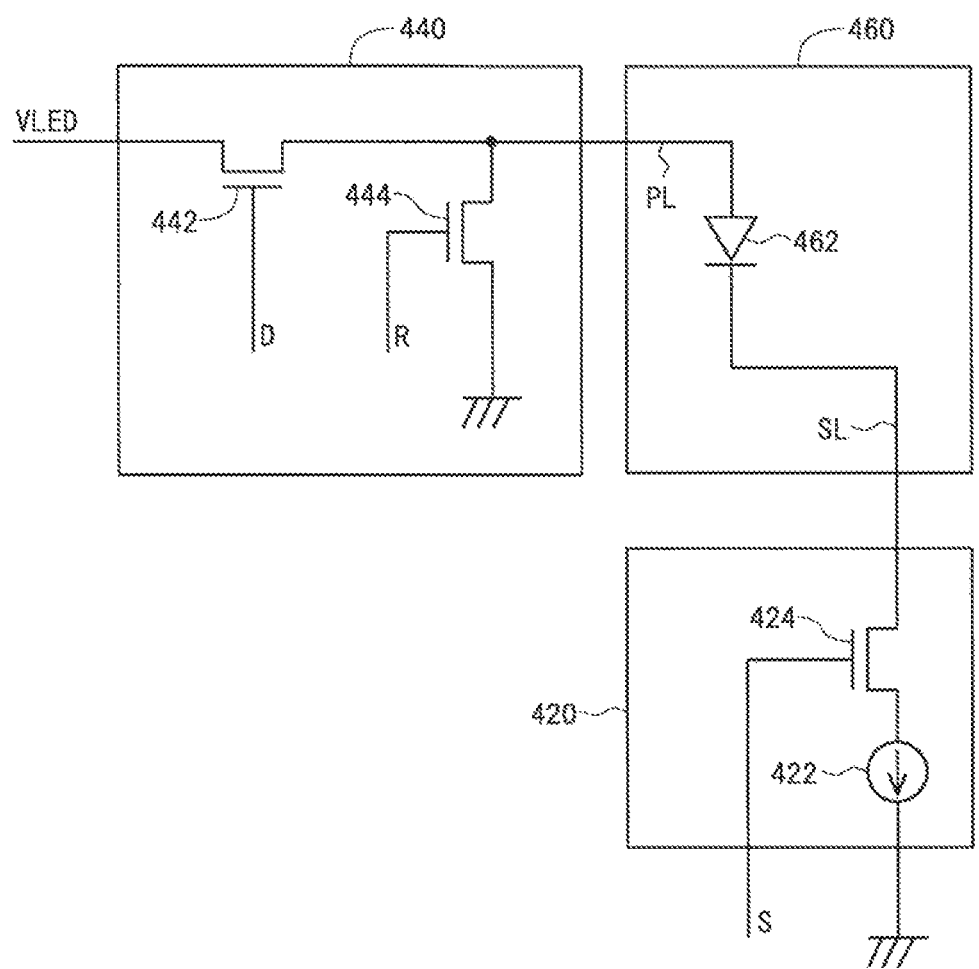
FIG. 6 is a circuit diagram showing only components corresponding to one LED (one area) in the first embodiment.

FIG. 6 is a circuit diagram showing only components corresponding to one LED 462 (one area). In the present embodiment, as shown in FIG. 6, each of the switches 424, 442, and 444 is implemented by one transistor. The switch 424 has a control terminal to which the control signal S is supplied, a first conduction terminal connected to the cathode of the LED 462 for a corresponding column, and a second conduction terminal connected to the constant current source 422. The switch 442 has a control terminal to which the control signal D is supplied, a first conduction terminal to which the power source voltage VLED is supplied, and a second conduction terminal connected to a corresponding power source line PL. The switch 444 has a control terminal to which the control signal R is supplied, a first conduction terminal connected to the corresponding power source line PL, and a second conduction terminal grounded electrically. It should be noted that each of the switches 424, 442, and 444 may be implemented by elements such as a plurality of transistors. The same applies to each of the switches 424, 442, 444, and 464 shown in FIG. 12, FIG. 14, and FIG. 18.

As grasped from FIG. 6, the power source voltage VLED is supplied to the anode of the LED 462 through the switch 442. During a period in which the control signal D is at the high level (during this period, the control signal R is maintained at the low level as described below), the switch 442 is maintained in the ON state, and the power source voltage VLED is supplied to the anode of the LED 462. In this state, during a period in which the control signal S in at the high level, the switch 424 is maintained in the ON state, and the constant current flows through the LED 462 (the LED 462 is turned on). On the other hand, in this state, during a period in which the control signal S is at the low level, the switch 424 is maintained in the OFF state, and the current does not flow through the LED 462 (the LED 462 is not turned on). Accordingly, it is possible to adjust a length of a lighting period of the LED 462 by controlling the ON/OFF state of the switch 424 by the control signal S during a period in which the control signal D is at the high level. By appropriately adjusting the length of the lighting period of the LED 462 in this manner, the LED 462 emits light at a desired luminance.

It should be noted that a power source supply control switch is implemented by the switch 442, a discharge control switch is implemented by the switch 444, a first control signal is implemented by the control signal R, and a second control signal is implemented by the control signal D.

<1.2.2 Control Method for Turn-on of LEDs>

Figure 7:
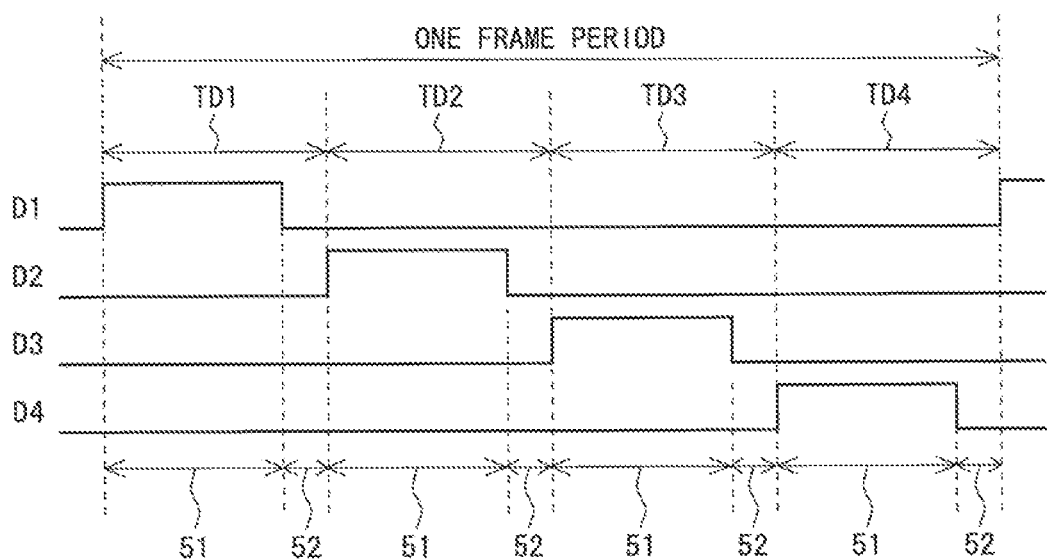
FIG. 7 is a diagram for describing one frame period in the first embodiment.

Next, a control method for turn-on of LEDs 462 will be described. In the present embodiment, each row is treated as one block (in other words, four LEDs 462 which are connected to each power source line PL are treated as one block), and turn-on of the LEDs 462 is performed time-divisionally and on a block-by-block basis. More specifically, as described above, the LEDs 462 are turned on at the first block BL1, at the second block BL2, at the third block BL3, and at the fourth block BL4 (see FIG. 5) in this order in each frame period. Namely, one frame period includes four display periods (a first display period TD1 to a fourth display period TD4) as shown in FIG. 7, and regarding the control signals D1 to D4, only the control signal D1 is at the high level in the first display period TD1, only the control signal D2 is at the high level in the second display period TD2, only the control signal D3 is at the high level in the third display period TD3, and only the control signal D4 is at the high level in the fourth display period TD4. Thus, for example, in the second display period TD2, the power source voltage VLED is supplied to the power source line PL2.

In the meantime, in the present embodiment, each display period includes a lighting allowable period 51 and a blanking period 52. The control signal D can be at the high level only in the lighting allowable period 51 out of the display period. Namely, in each display period, when the blanking period 52 comes, the supply of the power source voltage VLED to the power source line PL is stopped.

Figure 8:
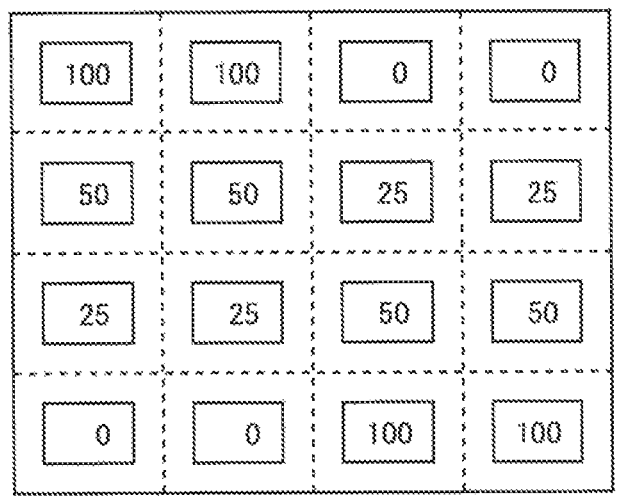
FIG. 8 is a diagram for showing an example of the target light emission luminances for respective LEDs in the first embodiment.
Figure 9:
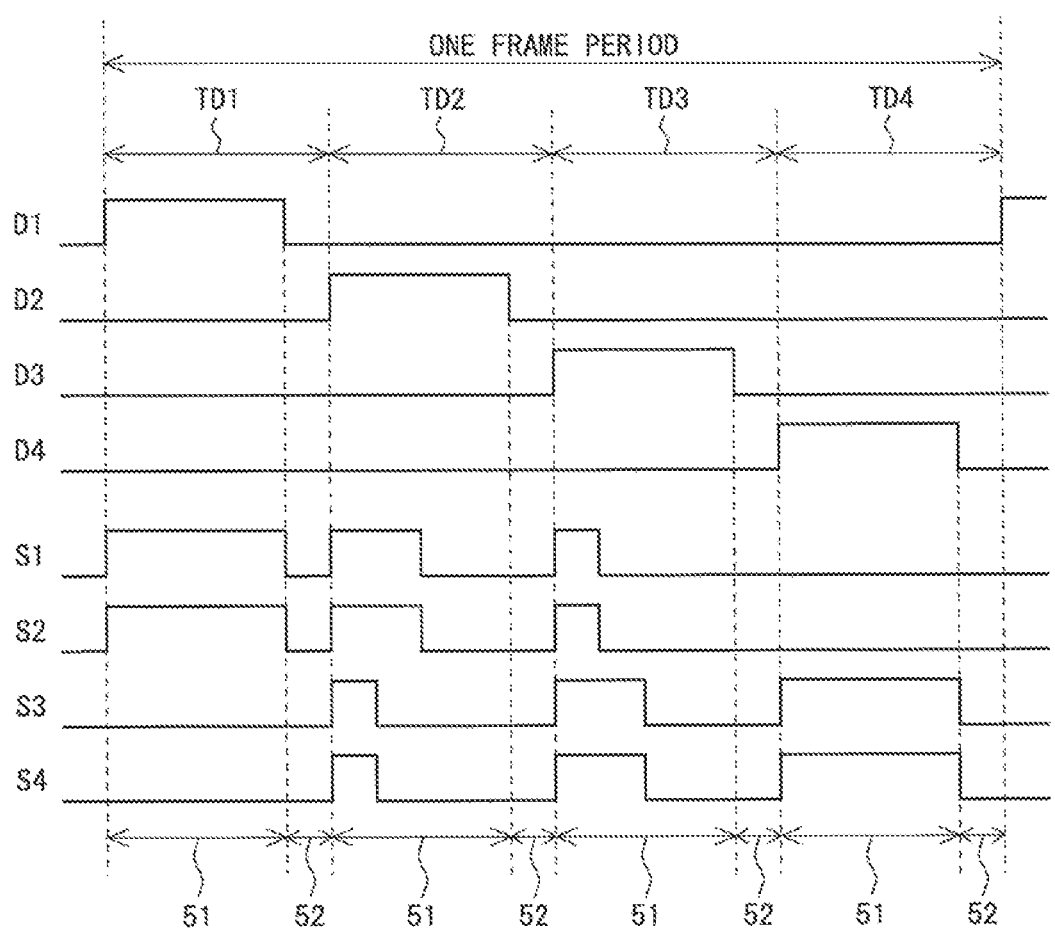
FIG. 9 is a signal waveform diagram for describing a fundamental control method regarding turn-on of LEDs in the first embodiment.

Here, taking a case in which the target light emission luminances for respective LEDs are as shown in FIG. 8 with the maximum luminance being 100 as an example, a fundamental control method regarding turn-on of the LEDs 462 will be described. FIG. 9 is a waveform diagram for the control signals D1 to D4 and the control signals S1 to S4 in this example.

During the lighting allowable period 51 in the first display period TD1, the control signal D1 is at the high level so that the LEDs 462 in the first block BL1 can be turned on. In addition, in order to satisfy that "the light emission luminance for the LED of the first column is 100, the light emission luminance for the LED of the second column is 100, the light emission luminance for the LED of the third column is 0, and the light emission luminance for the LED of the fourth column is 0" in regard to the first block BL1, the control signal S1 and the control signal S2 are maintained at the high level during the lighting allowable period 51 in the first display period TD1, and the control signal S3 and the control signal S4 are maintained at the low level during the lighting allowable period 51 in the first display period TD1. During the blanking period 52 in the first display period TD1, the control signals D1 to D4 and the control signals S1 to S4 are maintained at the low level. During the lighting allowable period 51 in the second display period TD2, the control signal D2 is at the high level so that the LEDs 462 in the second block BL2 can be turned on. In addition, in order to satisfy that "the light emission luminance for the LED of the first column is 50, the light emission luminance for the LED of the second column is 50, the light emission luminance for the LED of the third column is 25, and the light emission luminance for the LED of the fourth column is 25" in regard to the second block BL2, the control signal S1 and the control signal S2 are maintained at the high level only a period of half of the lighting allowable period 51 in the second display period TD2, and the control signal S3 and the control signal S4 are maintained at the high level only a period of quarter of the lighting allowable period 51 in the second display period TD2. During the blanking period 52 in the second display period TD2, the control signals D1 to D4 and the control signals S1 to S4 are maintained at the low level. In the same way, the control signal D3 is at the high level during the lighting allowable period 51 in the third display period TD3, and the control signal D4 is at the high level during the lighting allowable period 51 in the fourth display period TD4. In addition, in the lighting allowable period 51 in each of the third display period TD3 and the fourth display period TD4, waveforms for the control signals S1 to S4 change depending on the target light emission luminances for respective LEDs 462.

Next, with reference to FIG. 10, a case in which only an LED 462 of the third row and the third column (an LED 462 of the third column in the third block BL3) emits light with the maximum luminance and all other LEDs 462 does not emit light (a case in which the erroneous lighting occurs according to the conventional technique) will be described.

When the lighting allowable period 51 in the first display period TD1 comes, the control signal D1 changes from the low level to the high level. Thus, the switch 442 corresponding to the first block BL1 becomes the ON state, and a voltage level V (PL1) of the power source line PL1 (an anode voltage of each of the LEDs 462 in the first block BL1) increases to a voltage level of the power source voltage VLED. During the lighting allowable period 51 in the first display period TD1, all control signals S1 to S4 are maintained at the low level. Accordingly, all LEDs 462 in the first block BL1 do not emit light. When the blanking period 52 in the first display period TD1 comes, the control signal D1 changes from the high level to the low level and the control signal R1 changes from the low level to the high level. Thus, the switch 442 corresponding to the first block BL1 becomes the OFF state and the switch 444 corresponding to the first block BL1 becomes the ON state. As a result, since the power source line PL1 is connected to a ground, the voltage level V (PL1) of the power source line PL1 decreases rapidly in the blanking period 52 in the first display period TD1. In the second display period TD2, the same operation as in the first display period TD1 is performed.

When the lighting allowable period 51 in the third display period TD3 comes, the control signal D3 changes from the low level to the high level. Thus, the switch 442 corresponding to the third block BL3 becomes the ON state, and a voltage level V (PL3) of the power source line PL3 increases to the voltage level of the power source voltage VLED. During the lighting allowable period 51 in the third display period TD3, the control signal S3 is maintained at the high level and the control signals S1, S2, and S4 are maintained at the low level. Accordingly, in regard to the third block BL3, the LED 462 of the third column emits light with the maximum luminance and other LEDs 462 do not emit light. When the blanking period 52 in the third display period TD3 comes, the control signal D3 changes from the high level to the low level and the control signal R3 changes from the low level to the high level. Thus, the switch 442 corresponding to the third block BL3 becomes the OFF state and the switch 444 corresponding to the third block BL3 becomes the ON state. As a result, since the power source line PL3 is connected to the ground, the voltage level V (PL3) of the power source line PL3 decreases rapidly in the blanking period 52 in the third display period TD3. In the fourth display period TD4, the same operation as in the first display period TD1 is performed.

Figure 10:
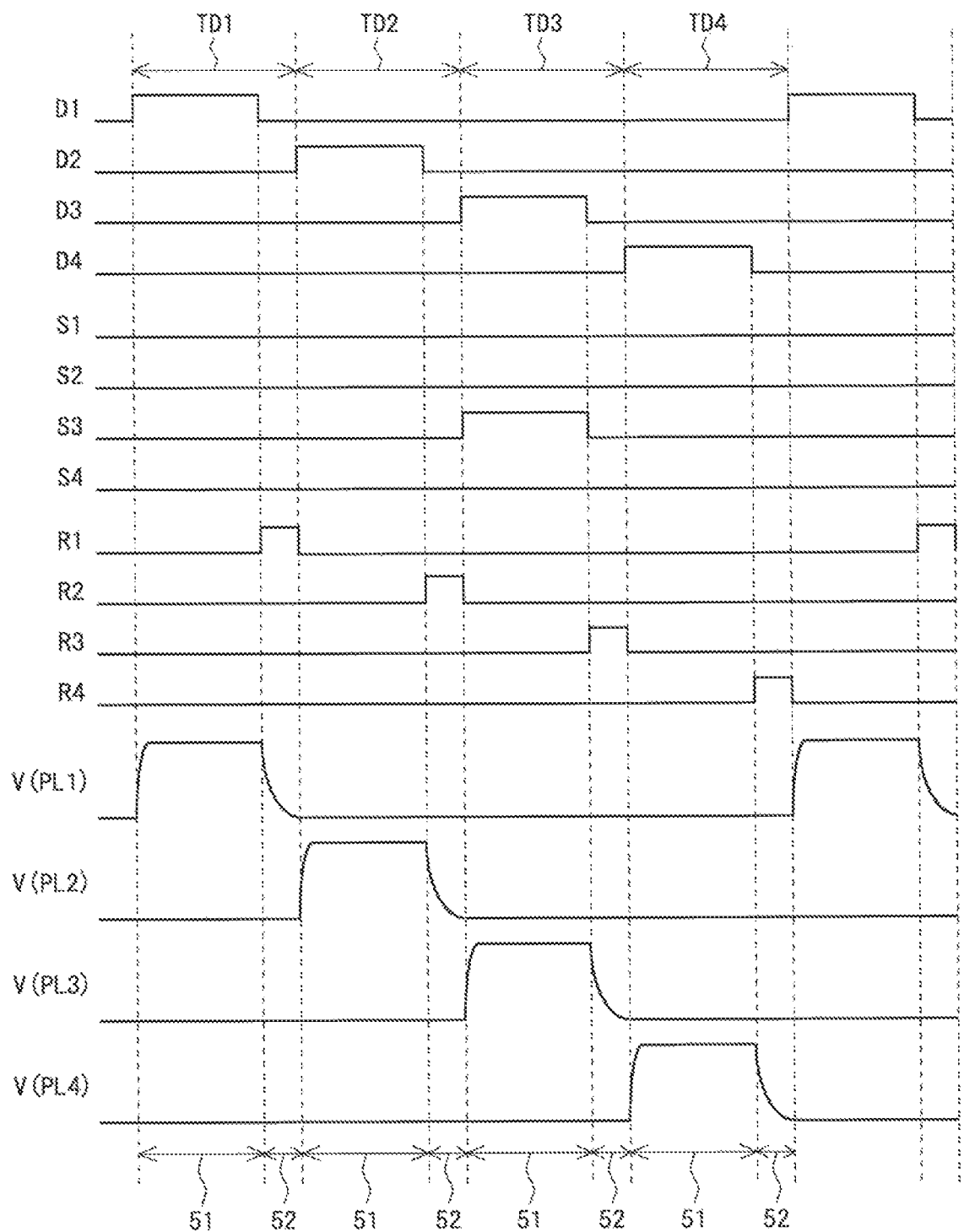
FIG. 10 is a signal waveform diagram for describing a detailed control method regarding turn-on of LEDs in the first embodiment.

As grasped from FIG. 10, each control signal R is at the high level only in the blanking period 52 out of the display period for a corresponding block. Accordingly, each switch 444 is in the ON state only in the blanking period 52 out of the display period for the corresponding block. More specifically, regarding two blocks driven in succession, when a block driven earlier is defined as a preceding block and a block driven later is defined as a succeeding block, the switch (the discharge control switch) 444 included in the discharge control circuit 440b corresponding to the preceding block becomes the ON state in a period from an end of a period in which the power source voltage VLED is supplied to the preceding block to a start of a period in which the power source voltage VLED is supplied to the succeeding block, based on the control signal R.

<1.3 Advantageous Effects>

Figure 11:
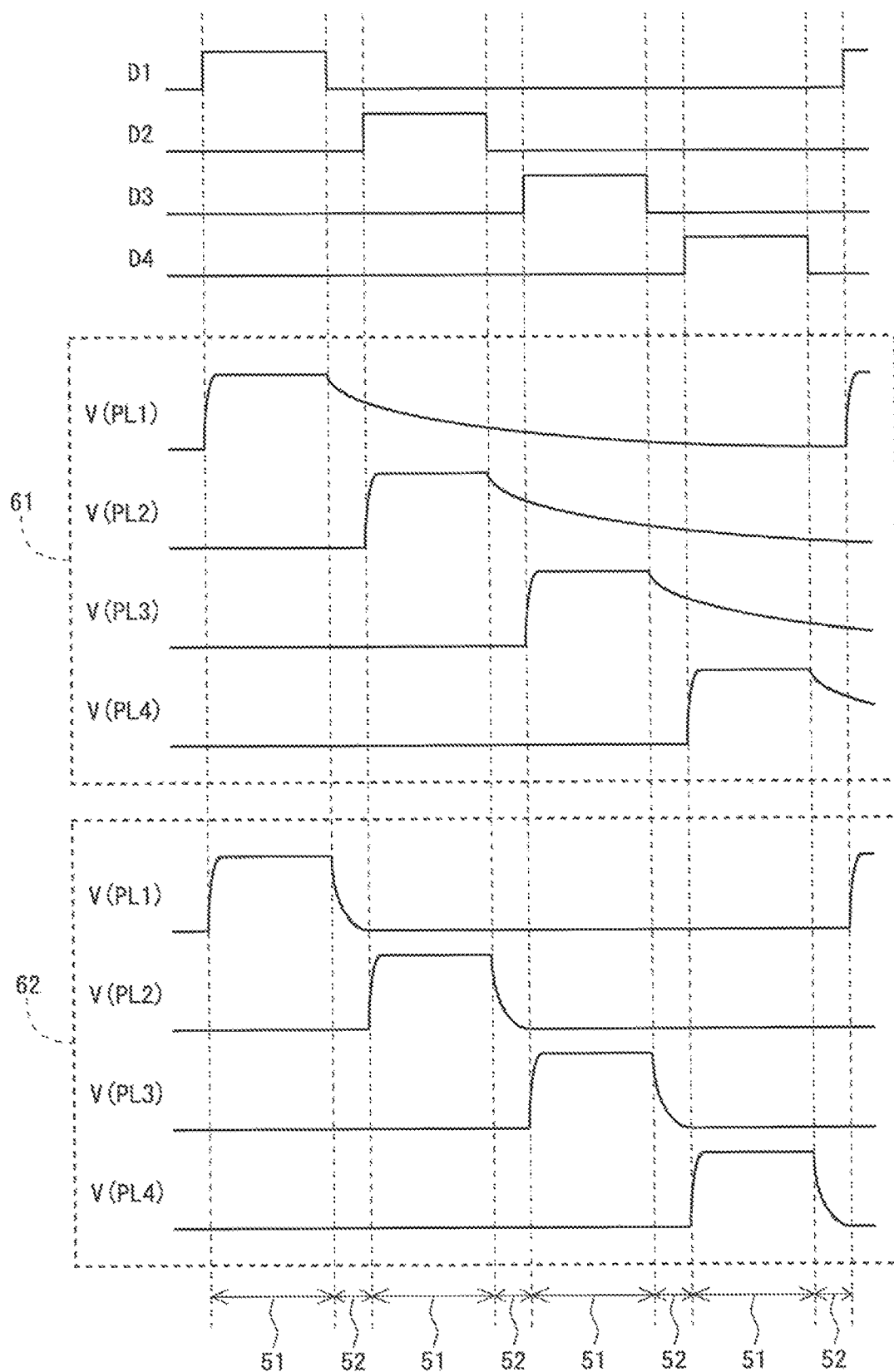
FIG. 11 is a signal waveform diagram for describing advantageous effects in the first embodiment.

According to the present embodiment, in the backlight 40 that performs the passive driving (time-division driving), a switch (for example, transistor) 444 having the first conduction terminal connected to the power source line PL and the second conduction terminal grounded electrically is provided for each block. In such a configuration, each switch 444 becomes the ON state after end of a period in which the power source voltage VLED is supplied to the power source line PL in a corresponding block (the lighting allowable period 51 for the corresponding block) based on the control signal R. Therefore, after end of the lighting allowable period 51 for each block, the voltage of the power source line PL in a corresponding block rapidly decreases. For example, while the voltages V (PL1) to V (PL4) of the respective power source lines PL1 to PL4 conventionally decrease as shown in a portion given reference character 61 in FIG. 11, the voltages V (PL1) to V (PL4) of the respective power source lines PL1 to PL4 decrease as shown in a portion given reference character 62 in FIG. 11 in the present embodiment. Thus, after end of the lighting allowable period 51 for each block, the anode voltage of each of the LEDs 460 included in a corresponding block rapidly decreases. Accordingly, a current does not flow through the LEDs 462 included in each block in a period other than the display period for a corresponding block. As a result, the erroneous lighting of the LEDs 462 is prevented from occurrence. As above, according to the present embodiment, it is possible to implement the backlight 40 that can perform the passive driving (time-division driving) of LEDs 462 without causing erroneous lighting.

2. Second Embodiment

<2.1 Configuration>

Figure 12:
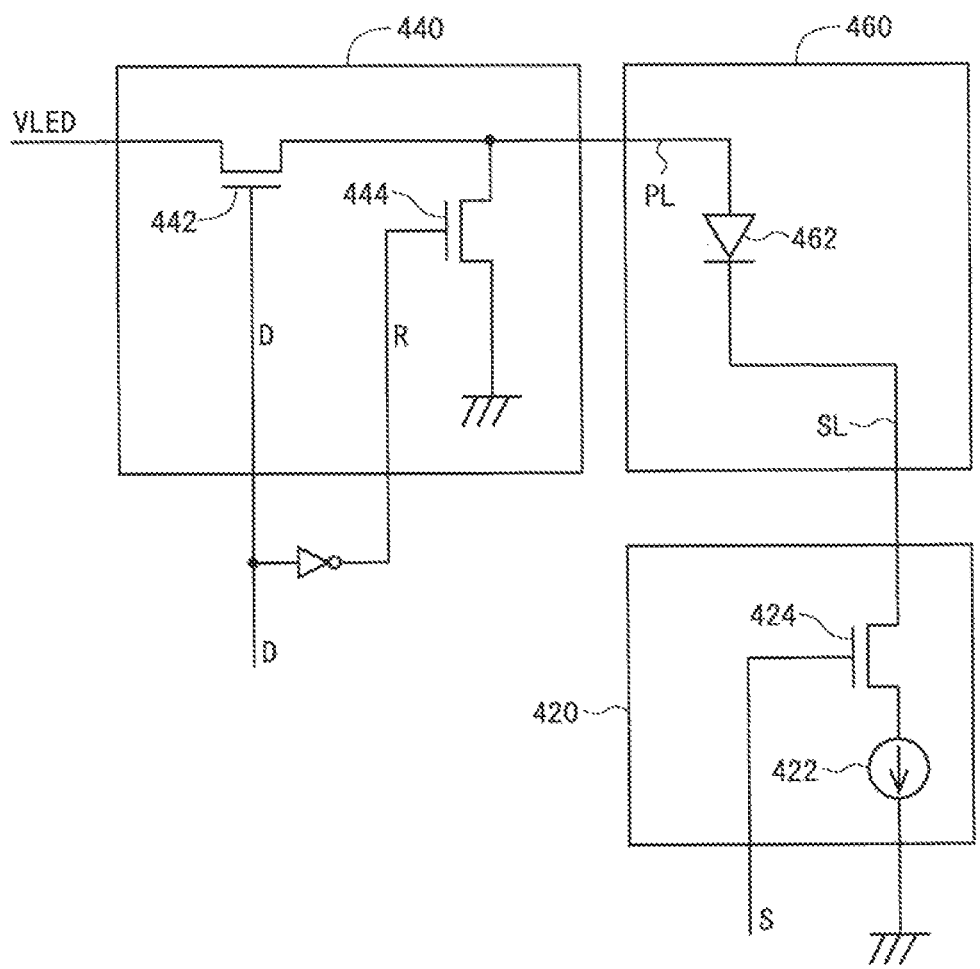
FIG. 12 is a circuit diagram showing only components corresponding to one LED (one area) in a second embodiment.

FIG. 12 is a circuit diagram showing only components corresponding to one LED 462 (one area). As grasped from FIG. 12, in the present embodiment, as the control signal R, a logical inversion signal of the control signal D supplied to the control terminal of the switch 442 is supplied to the control terminal of the switch 444 in the power source voltage supply control circuit 440. Accordingly, regarding the overall configuration (see FIG. 2), it is not required to transmit the discharge control signal ECTL as the control signals R1 to R4 from the local dimming processing unit 10 to the power source voltage supply control circuit 440. Other points are the same as those in the first embodiment.

<2.2 Control Method for Turn-On of LEDs>

Figure 13:
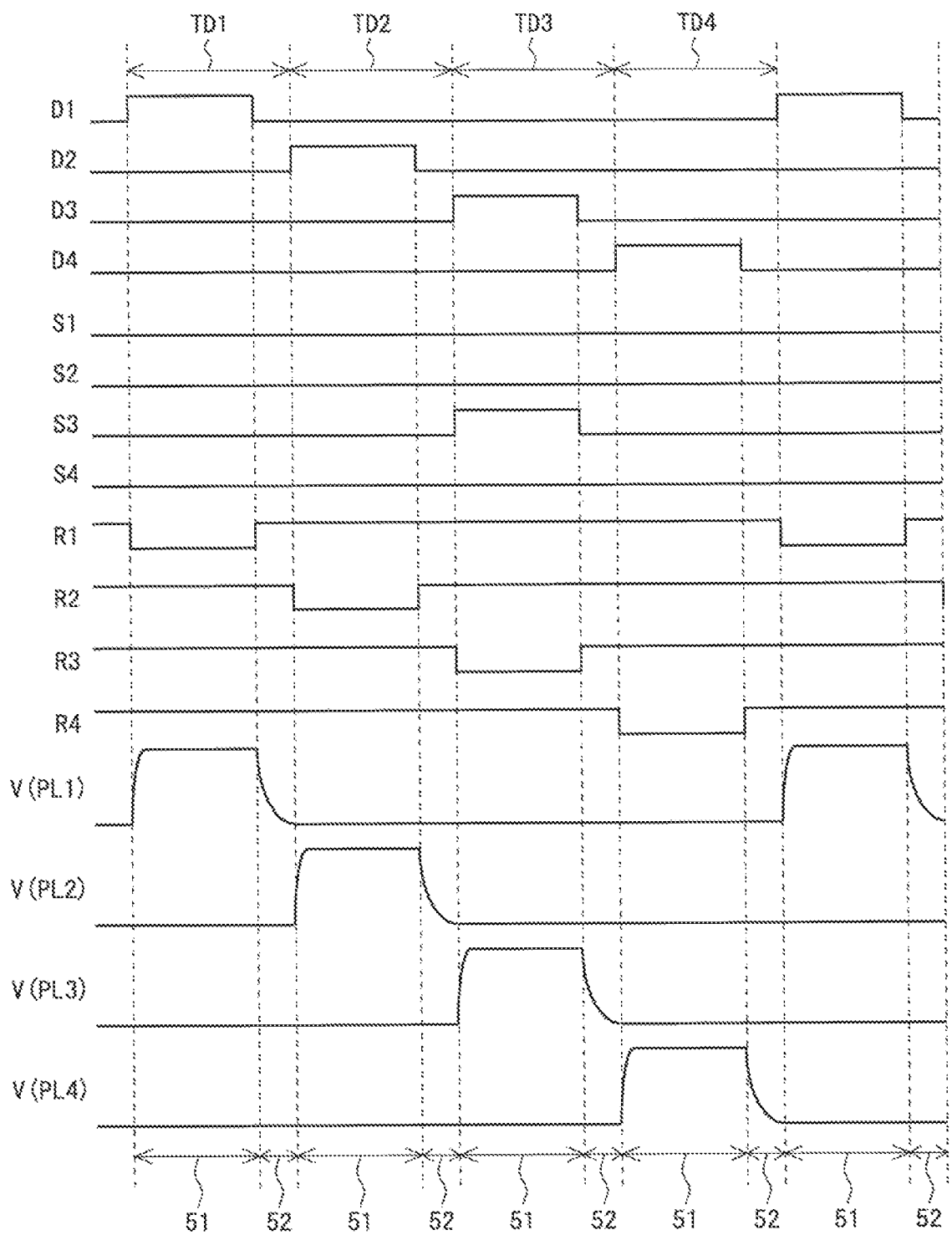
FIG. 13 is a signal waveform diagram for describing a detailed control method regarding turn-on of LEDs in the second embodiment.

Next, with reference to FIG. 13, a control method for turn-on of LEDs 462 will be described. Also here, we focus on a case in which only an LED 462 of the third row and the third column (an LED 462 of the third column in the third block BL3) emits light with the maximum luminance and all other LEDs 462 do not emit light (a case in which the erroneous lighting occurs according to the conventional technique).

When the lighting allowable period 51 in the first display period TD1 comes, the control signal D1 changes from the low level to the high level and the control signal R1 changes from the high level to the low level. Thus, the switch 442 corresponding to the first block BL1 becomes the ON state and the switch 444 corresponding to the first block BL1 becomes the OFF state, and the voltage level V (PL1) of the power source line PL1 (an anode voltage of each of the LEDs 462 in the first block BL1) increases to the voltage level of the power source voltage VLED. During the lighting allowable period 51 in the first display period TD1, all control signals S1 to S4 are maintained at the low level. Accordingly, all LEDs 462 in the first block BL1 do not emit light. When the blanking period 52 in the first display period TD1 comes, the control signal D1 changes from the high level to the low level and the control signal R1 changes from the low level to the high level. Thus, the switch 442 corresponding to the first block BL1 becomes the OFF state and the switch 444 corresponding to the first block BL1 becomes the ON state. As a result, since the power source line PL1 is connected to the ground, the voltage level V (PL1) of the power source line PL1 decreases rapidly in the blanking period 52 in the first display period TD1. In the second display period TD2, the same operation as in the first display period TD1 is performed.

When the lighting allowable period 51 in the third display period TD3 comes, the control signal D3 changes from the low level to the high level and the control signal R3 changes from the high level to the low level. Thus, the switch 442 corresponding to the third block BL3 becomes the ON state and the switch 444 corresponding to the third block BL3 becomes the OFF state, and the voltage level V (PL3) of the power source line PL3 increases to the voltage level of the power source voltage VLED. During the lighting allowable period 51 in the third display period TD3, the control signal S3 is maintained at the high level and the control signals S1, S2, and S4 are maintained at the low level. Accordingly, in regard to the third block BL3, the LED 462 of the third column emits light with the maximum luminance and other LEDs 462 do not emit light. When the blanking period 52 in the third display period TD3 comes, the control signal D3 changes from the high level to the low level and the control signal R3 changes from the low level to the high level. Thus, the switch 442 corresponding to the third block BL3 becomes the OFF state and the switch 444 corresponding to the third block BL3 becomes the ON state. As a result, since the power source line PL3 is connected to the ground, the voltage level V (PL3) of the power source line PL3 decreases rapidly in the blanking period 52 in the third display period TD3. In the fourth display period TD4, the same operation as in the first display period TD1 is performed.

As above, after end of the lighting allowable period 51 for each block, the voltage of the power source line PL in a corresponding block rapidly decreases. Accordingly, the erroneous lighting is prevented from occurrence.

<2.3 Advantageous Effects>

According to the present embodiment, as in the first embodiment, it is possible to implement the backlight 40 that can perform the passive driving (time-division driving) of LEDs 462 without causing erroneous lighting. In addition, a length of a period during which the control signal R is maintained at the high level is longer as compared to the first embodiment (see FIG. 10 and FIG. 13). Accordingly, discharge of residual electric charge (electric charge on the power source line PL) causing the erroneous lighting is performed over a longer period of time. Therefore, the erroneous lighting is effectively prevented from occurrence as compared to the first embodiment.

3. Third Embodiment

<3.1 Configuration>

Figure 14:
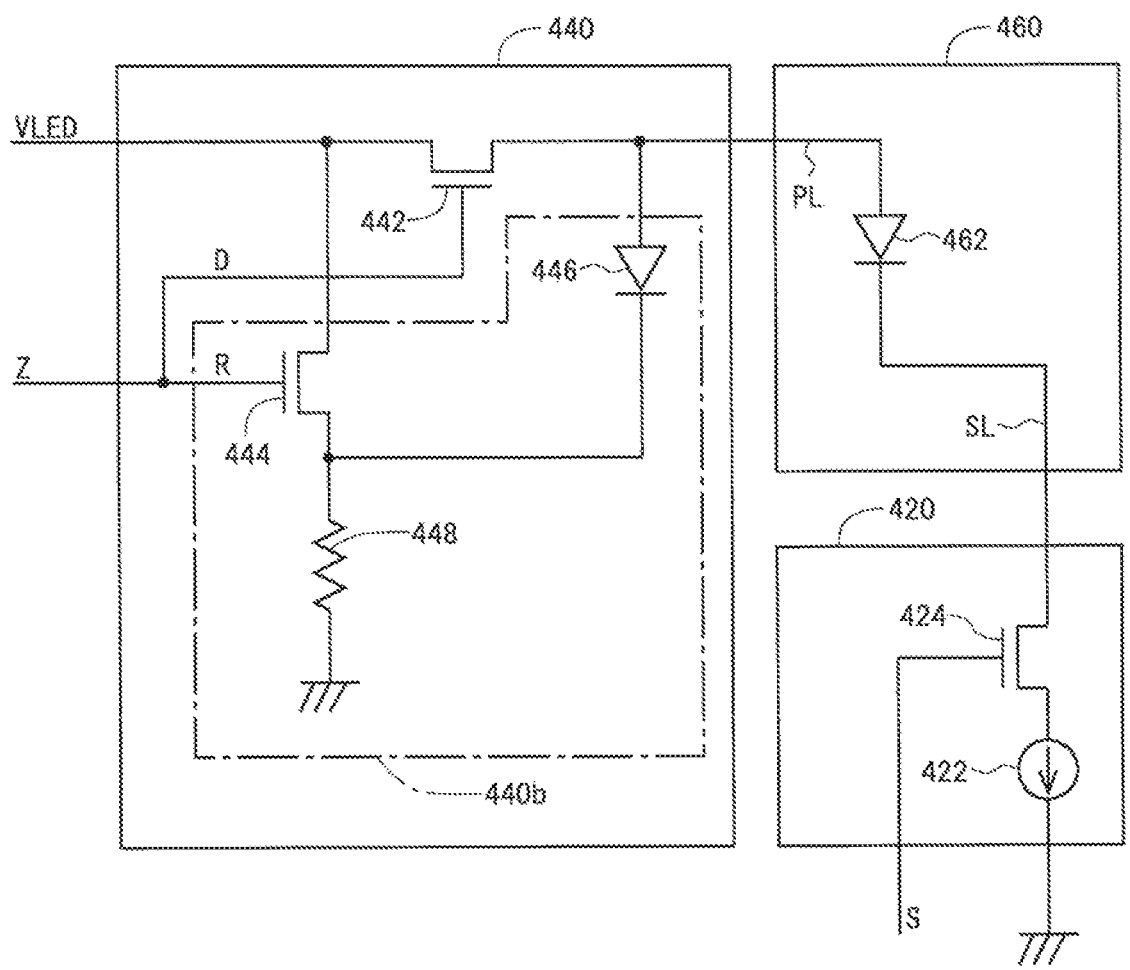
FIG. 14 is a circuit diagram showing only components corresponding to one LED (one area) in a third embodiment.

FIG. 14 is a circuit diagram showing only components corresponding to one LED 462 (one area). The discharge control circuit 440b in the power source voltage supply control circuit 440 in the present embodiment includes a switch 444, a diode 446, and a resistor 448. Regarding the switch 444, the control signal R is supplied to the control terminal, the power source voltage VLED is supplied to the first conduction terminal, and the second conduction terminal is connected to the cathode of the diode 446 and one end of the resistor 448. Regarding the diode 446, the anode is connected to the power source line PL, and the cathode is connected to the second conduction terminal of the switch 444 and the one end of the resistor 448. Regarding the resistor 448, the one end is connected to the second conduction terminal of the switch 444 and the cathode of the diode 446, and the other end is grounded. Regarding the switch 442 constituting the power supply switching circuit 440a, the control signal D is supplied to the control terminal, the power source voltage VLED is supplied to the first conduction terminal, and the second conduction terminal is connected to a corresponding power source line PL. In the meantime, as grasped from FIG. 14, the control signal R and the control signal D are the same signal Z. Accordingly, regarding the overall configuration (see FIG. 2), it is sufficient to transmit only the signal corresponding to the switching control signal SWCTL, for example, from the local dimming processing unit 10 to the power source voltage supply control circuit 440.

In the configuration as described above, during a period in which the control signal D (the signal Z) is at the high level, the switch 442 is maintained at the ON state. In this period, since the switch 444 is also in the ON state, the anode voltage of the diode 446 becomes equal to the cathode voltage thereof. Accordingly, a current does not flow through the diode 446. As a result, the power source voltage VLED is supplied to the anode of the LED 462. During a period in which the control signal D (the signal Z) is at the low level, the switch 442 is maintained at the OFF state. In this period, the switch 444 is also in the OFF state, and a current does not flow through the switch 444. Accordingly, the cathode voltage of the diode 446 becomes equal to the ground potential. As a result, electric charge on the power source line PL (residual electric charge) is discharged thorough the diode 446. In this way, when the control signal D (the signal Z) changes from the high level to the low level, the residual electric charge is discharged thorough the diode 446.

<3.2 Control Method for Turn-On of LEDs>

Figure 15:
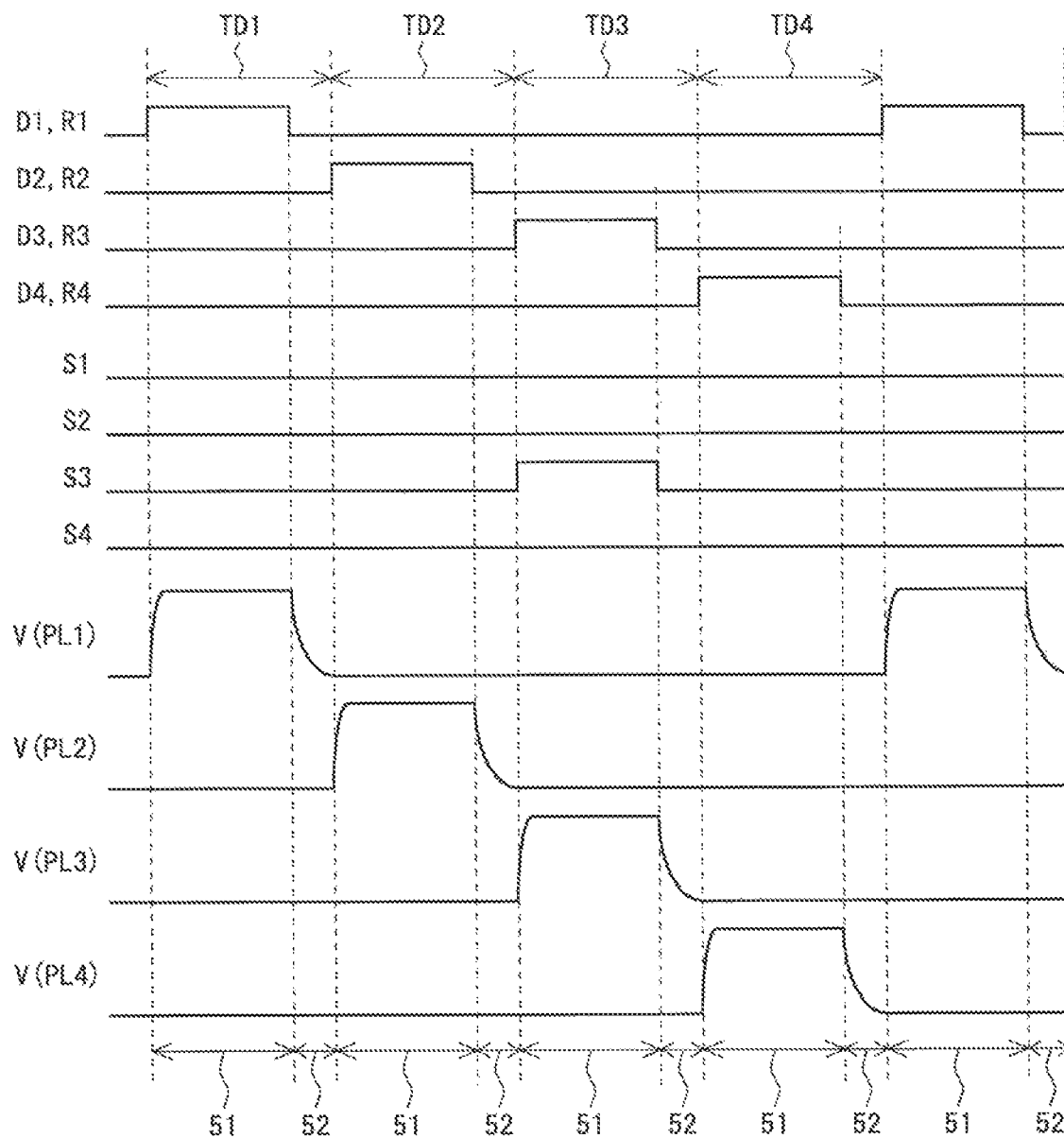
FIG. 15 is a signal waveform diagram for describing a detailed control method regarding turn-on of LEDs in the third embodiment.

Next, with reference to FIG. 15, a control method for turn-on of LEDs 462 will be described. Also here, we focus on a case in which only an LED 462 of the third row and the third column (an LED 462 of the third column in the third block BL3) emits light with the maximum luminance and all other LEDs 462 do not emit light (a case in which the erroneous lighting occurs according to the conventional technique).

When the lighting allowable period 51 in the first display period TD1 comes, the control signals D1 and R1 changes from the low level to the high level. Thus, the switch 442 and the switch 444 which are corresponding to the first block BL1 become the ON state. In this period, since a current does not flow thorough the diode 446 corresponding to the first block BL1 as described above, the voltage level V (PL1) of the power source line PL1 (the anode voltage of each of the LEDs 462 in the first block BL1) increases to the voltage level of the power source voltage VLED. During the lighting allowable period 51 in the first display period TD1, all control signals S1 to S4 are maintained at the low level. Accordingly, all LEDs 462 in the first block BL1 do not emit light. When the blanking period 52 in the first display period TD1 comes, the control signals D1 and R1 change from the high level to the low level. Thus, the switch 442 and the switch 444 which are corresponding to the first block BL1 become the OFF state. In this period, the cathode voltage of the diode 446 corresponding to the first block BL1 becomes equal to the ground potential as described above, electric charge on the power source line PL1 (residual electric charge) is discharged thorough the diode 446, and the voltage level V (PL1) of the power source line PL1 decreases rapidly in the blanking period 52 in the first display period TD1. In the second display period TD2, the same operation as in the first display period TD1 is performed.

When the lighting allowable period 51 in the third display period TD3 comes, the control signals D3 and R3 change from the low level to the high level. Thus, the switch 442 and the switch 444 which are corresponding to the third block BL3 become the ON state. In this period, since a current does not flow thorough the diode 446 corresponding to the third block BL3 as described above, the voltage level V (PL3) of the power source line PL3 increases to the voltage level of the power source voltage VLED. During the lighting allowable period 51 in the third display period TD3, the control signal S3 is maintained at the high level and the control signals S1, S2, and S4 are maintained at the low level. Accordingly, in regard to the third block BL3, the LED 462 of the third column emits light with the maximum luminance and other LEDs 462 do not emit light. When the blanking period 52 in the third display period TD3 comes, the control signals D3 and R3 change from the high level to the low level. Thus, the switch 442 and the switch 444 which are corresponding to the third block BL3 become the OFF state. In this period, the cathode voltage of the diode 446 corresponding to the third block BL3 becomes equal to the ground potential as described above, electric charge on the power source line PL3 (residual electric charge) is discharged thorough the diode 446, and the voltage level V (PL3) of the power source line PL3 decreases rapidly in the blanking period 52 in the third display period TD3. In the fourth display period TD4, the same operation as in the first display period TD1 is performed.

As above, after end of the lighting allowable period 51 for each block, the voltage of the power source line PL in a corresponding block rapidly decreases. Accordingly, the erroneous lighting is prevented from occurrence.

<3.3 Advantageous Effects>

According to the present embodiment, as in the first embodiment, it is possible to implement the backlight 40 that can perform the passive driving (time-division driving) of LEDs 462 without causing erroneous lighting. In addition, since the ON/OFF state of each of the switch 442 and the switch 444 which are included in each power source voltage supply control circuit 440 is controlled by one signal Z, it is possible to reduce a circuit cost.

4. Fourth Embodiment

<4.1 Configuration>

Figure 16:
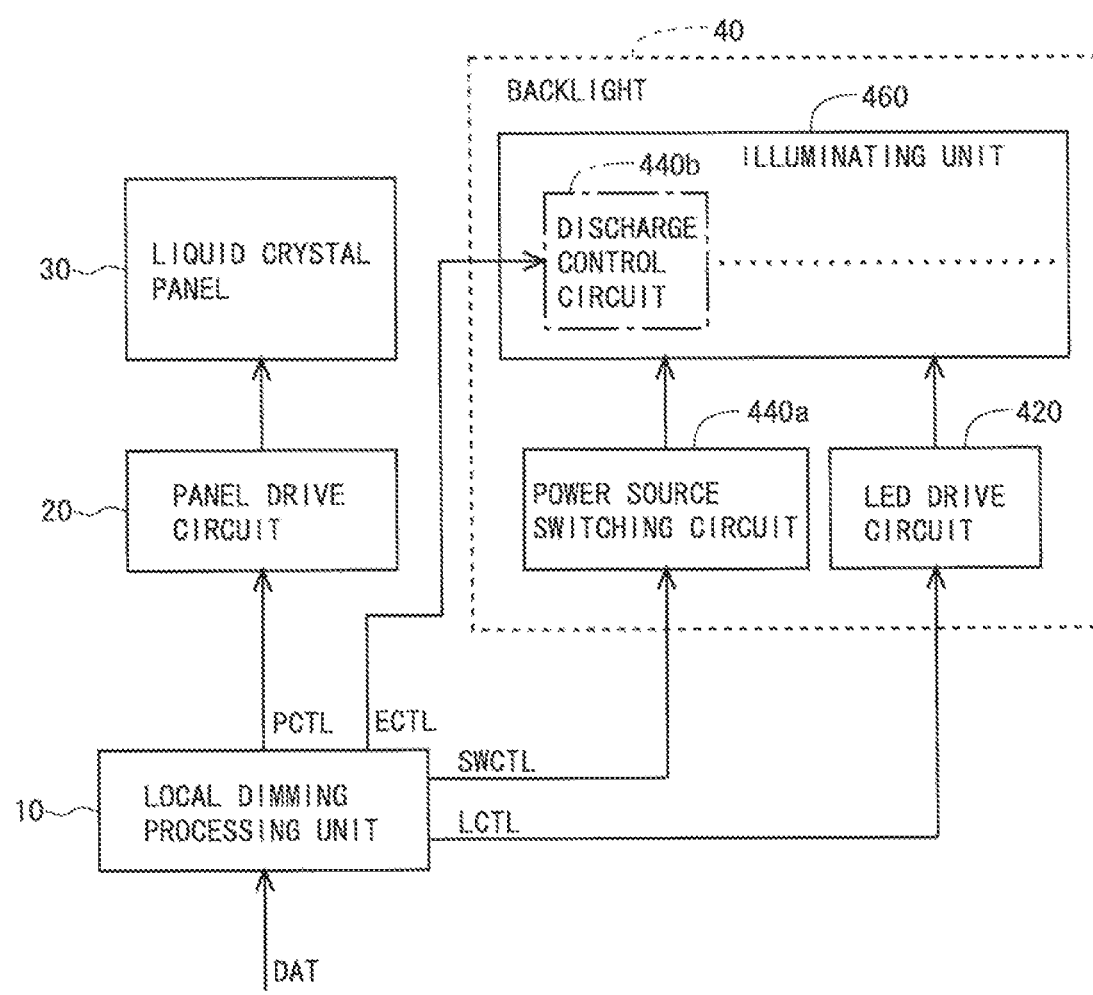
FIG. 16 is a block diagram showing an overall configuration of a liquid crystal display device in a fourth embodiment.
Figure 17:
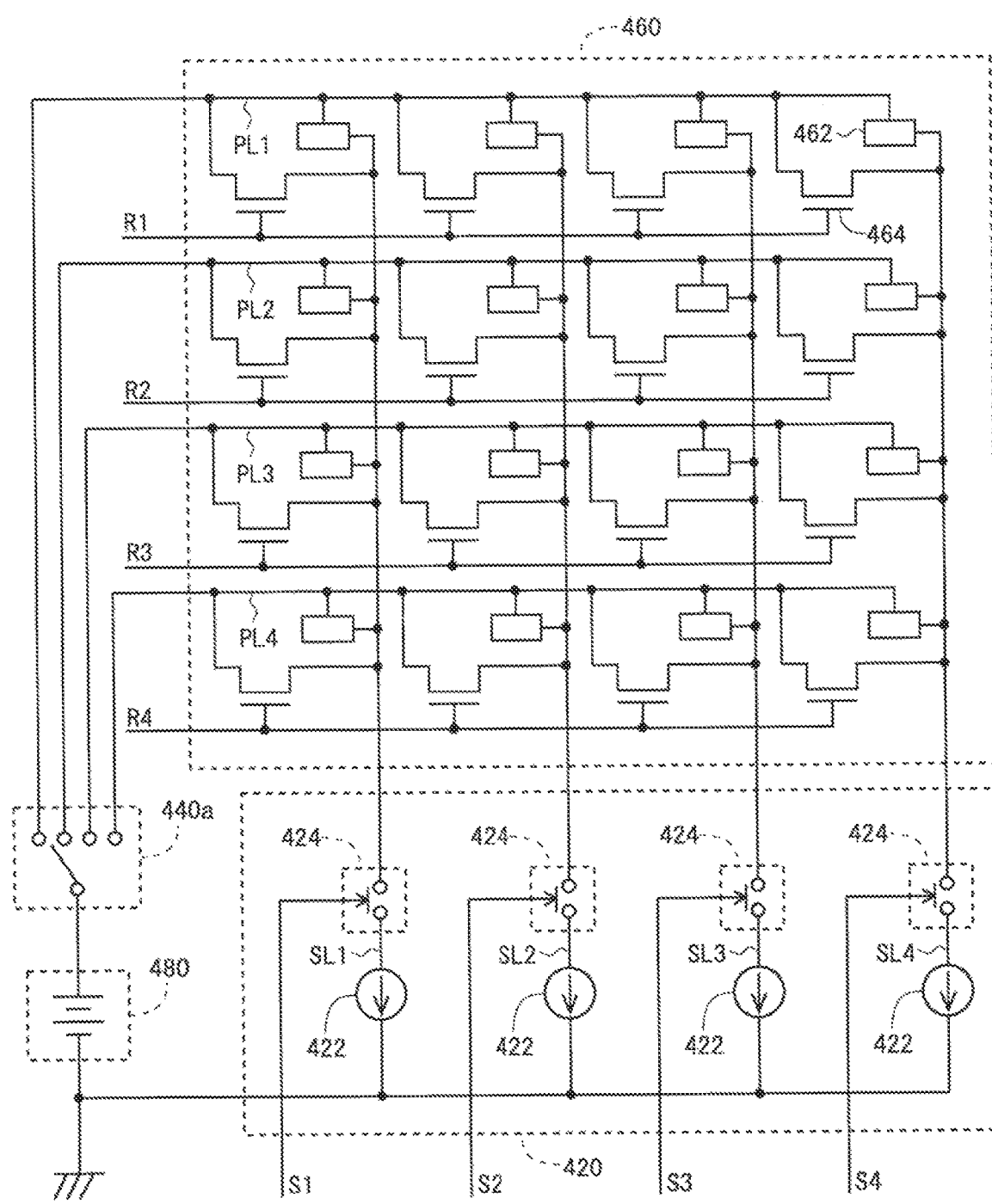
FIG. 17 is a schematic circuit diagram for describing a configuration of a backlight in the fourth embodiment.

FIG. 16 is a block diagram showing an overall configuration of a liquid crystal display device according to a fourth embodiment. FIG. 17 is a schematic circuit diagram for describing a configuration of a backlight 40 in the present embodiment. In the first to third embodiments, the power supply switching circuit 440a and the discharge control circuit 440b are provided in the power source voltage supply control circuit 440. In contrast, in the present embodiment, the discharge control circuit 440b is provided in the illuminating unit 460. The backlight 40 includes the LED drive circuit 420, the power supply switching circuit 440a, the illuminating unit 460, and the LED power source 480. The configuration of the LED drive circuit 420 is the same as that in the first embodiment. As the discharge control signal ECTL, four control signals R1 to R4 are supplied from the local dimming processing unit 10 to the illuminating unit 460. In addition, in the illuminating unit 460, one LED 462 and one switch 464 (for example, transistor) are provided for each area.

Figure 18:
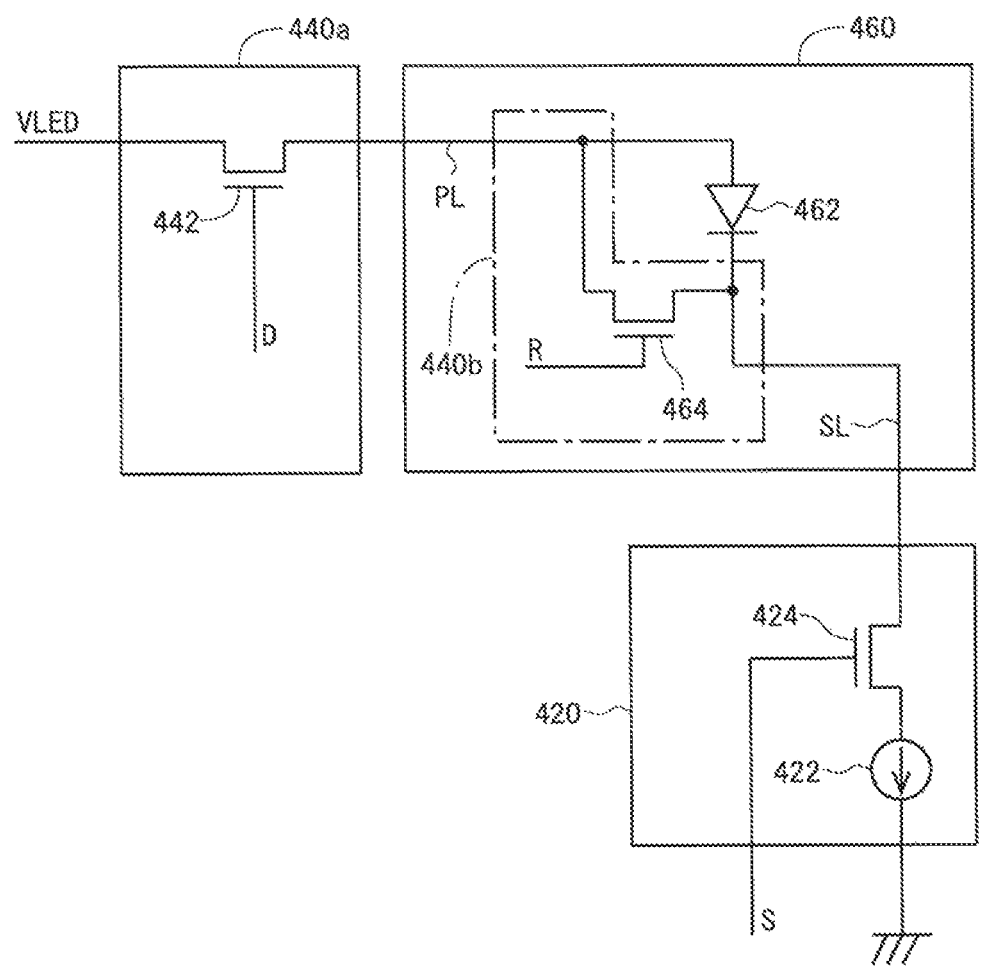
FIG. 18 is a circuit diagram showing only components corresponding to one LED (one area) in the fourth embodiment.

FIG. 18 is a circuit diagram showing only components corresponding to one LED 462 (one area) in the present embodiment. Regarding the LED 462, the anode is connected to a corresponding power source line PL and the cathode is connected to a corresponding turn-on control line SL. Regarding the switch 464, the control signal R is supplied to the control terminal, the first conduction terminal is connected to the corresponding power source line PL (in other words, the first conduction terminal is connected to the anode of a corresponding LED 462), and the second conduction terminal is connected to the cathode of the corresponding LED 462. It should be noted that, when the above-described definition "LED unit" is used, the second conduction terminal of the switch 464 is connected to a downstream end of a corresponding LED unit. In addition, a plurality of discharge control circuits 440b are provided in one-to-one correspondence with the plurality of LED units in the illuminating unit 460.

In the configuration as described above, regarding each block, during a period in which the control signal D is at the high level (in this period, the control signal R is maintained at the low level as described below), the switch 442 is maintained in the ON state. Thus, the power source voltage VLED is supplied to the anode of the LED 462. In this period, since the switch 464 is maintained in the OFF state, depending on the control of the ON/OFF state of the switch 424 included in the LED drive circuit 420, a corresponding LED 462 emits light. Regarding each block, when the control signal D changes from the high level to the low level, a corresponding control signal R changes from the low level to the high level. Thus, the switch 464 becomes the ON state, and the anode of the corresponding LED 462 and the cathode thereof are electrically connected. As a result, the anode voltage of the corresponding LED 462 (the voltage of the power source line PL for the corresponding block) decreases.

<4.2 Control Method for Turn-On of LEDs>

Next, with reference to FIG. 19, a control method for turn-on of LEDs 462 will be described. Also here, we focus on a case in which only an LED 462 of the third row and the third column (an LED 462 of the third column in the third block BL3) emits light with the maximum luminance and all other LEDs 462 do not emit light (a case in which the erroneous lighting occurs according to the conventional technique).

When the lighting allowable period 51 in the first display period TD1 comes, the control signal D1 changes from the low level to the high level and the control signals R1 is maintained at the low level. Thus, the switch 442 corresponding to the first block BL1 becomes the ON state and the switches 464 corresponding to the first block BL1 are maintained in the OFF state. According the voltage level V (PL1) of the power source line PL1 (the anode voltage of each of the LEDs 462 in the first block BL1) increases to the voltage level of the power source voltage VLED. During the lighting allowable period 51 in the first display period TD1, all control signals S1 to S4 are maintained at the low level. Accordingly, all LEDs 462 in the first block BL1 do not emit light. When the blanking period 52 in the first display period TD1 comes, the control signal D1 changes from the high level to the low level and the control signal R1 changes from the low level to the high level. Further, in the blanking period 52 in the first display period TD1, the control signals S1 to S4 are maintained at the high level. Thus, since the switches 464 in the first block BL1 and all switches 424 in the LED drive circuit 420 become the ON state, electric charge on the power source line PL1 is discharged thorough the switches 464 and the switches 424. As a result, the voltage level V (PL1) of the power source line PL1 decreases rapidly in the blanking period 52 in the first display period TD1. In the second display period TD2, the same operation as in the first display period TD1 is performed.

When the lighting allowable period 51 in the third display period TD3 comes, the control signal D3 changes from the low level to the high level and the control signal R3 maintained at the low level. Thus, the switch 442 corresponding to the third block BL3 becomes the ON state and the switches 464 corresponding to the third block BL3 are maintained in the OFF state. Accordingly, the voltage level V (PL3) of the power source line PL3 increases to the voltage level of the power source voltage VLED. During the lighting allowable period 51 in the third display period TD3, the control signal S3 is maintained at the high level and the control signals S1, S2, and S4 are maintained at the low level. Accordingly, in regard to the third block BL3, the LED 462 of the third column emits light with the maximum luminance and other LEDs 462 do not emit light. When the blanking period 52 in the third display period TD3 comes, the control signal D3 changes from the high level to the low level and the control signal R3 changes from the low level to the high level. Further, in the blanking period 52 in the third display period TD3, the control signals S1 to S4 are maintained at the high level. Thus, since the switches 464 in the third block BL3 and all switches 424 in the LED drive circuit 420 become the ON state, electric charge on the power source line PL3 is discharged thorough the switches 464 and the switches 424. As a result, the voltage level V (PL3) of the power source line PL3 decreases rapidly in the blanking period 52 in the third display period TD3. In the fourth display period TD4, the same operation as in the first display period TD1 is performed.

Figure 19:
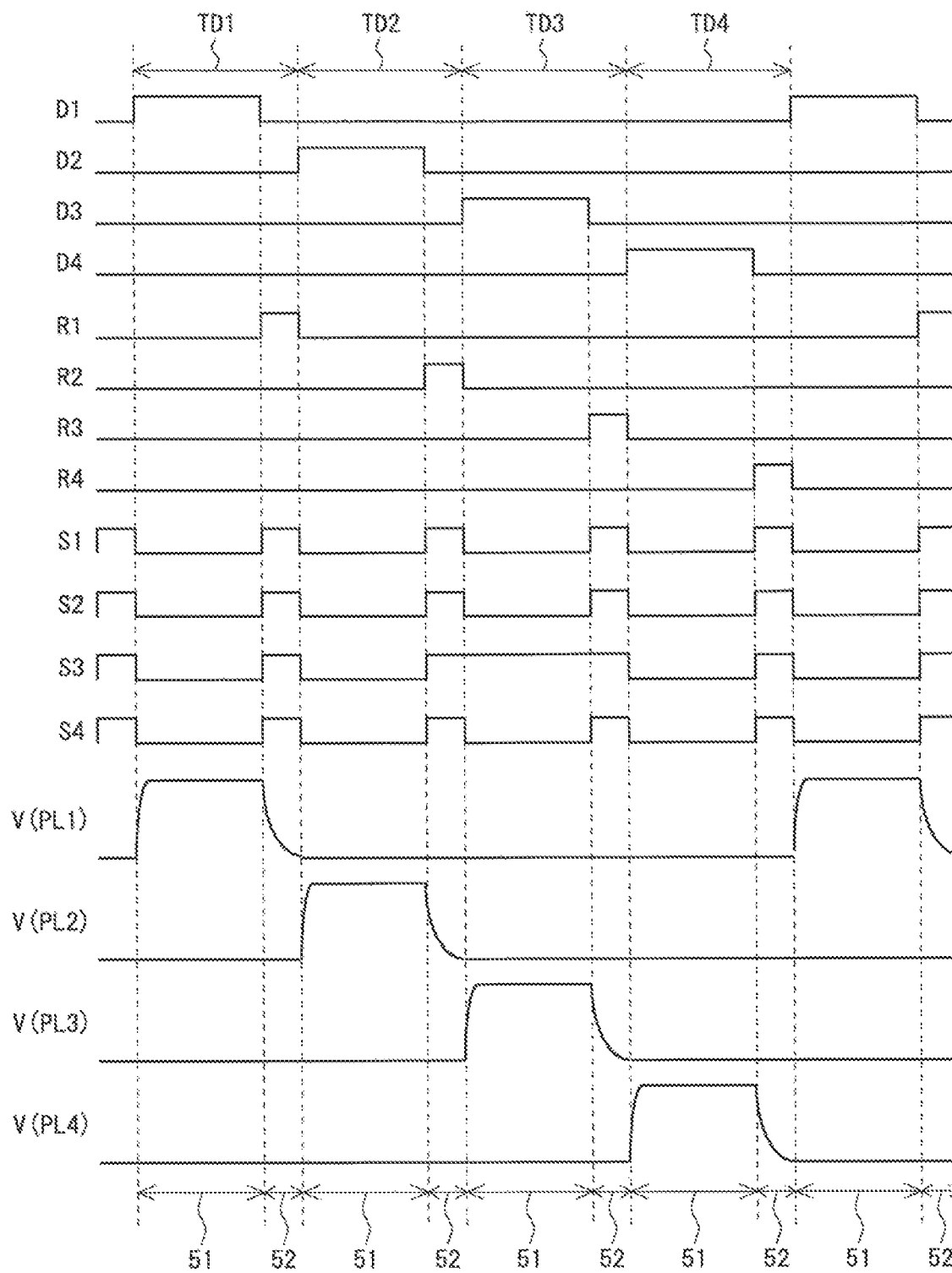
FIG. 19 is a signal waveform diagram for describing a detailed control method regarding turn-on of LEDs in the fourth embodiment.

It should be noted that, by waveforms of the control signals R1 to R4 changing as shown in FIG. 19, each switch 464 can be in the ON state in the blanking period 52 out of the display period for a corresponding block. More specifically, regarding two blocks driven in succession, when a block driven earlier is defined as a preceding block and a block driven later is defined as a succeeding block, the switch (the discharge control switch) 464 included in the discharge control circuit 440b corresponding to the preceding block becomes the ON state in a period from an end of a period in which the power source voltage VLED is supplied to the preceding block to a start of a period in which the power source voltage VLED is supplied to the succeeding block, based on the control signal R.

As above, after end of the lighting allowable period 51 for each block, the voltage of the power source line PL in a corresponding block rapidly decreases. Accordingly, the erroneous lighting is prevented from occurrence.

<4.3 Advantageous Effects>

According to the present embodiment, as in the first embodiment, it is possible to implement the backlight 40 that can perform the passive driving (time-division driving) of LEDs 462 without causing erroneous lighting. In addition, since the switch 464 is provided for each area, it is possible to effectively prevent the erroneous lighting from occurrence even when the number of area divisions continues to increase.

<4.4 Variant>

Figure 20:
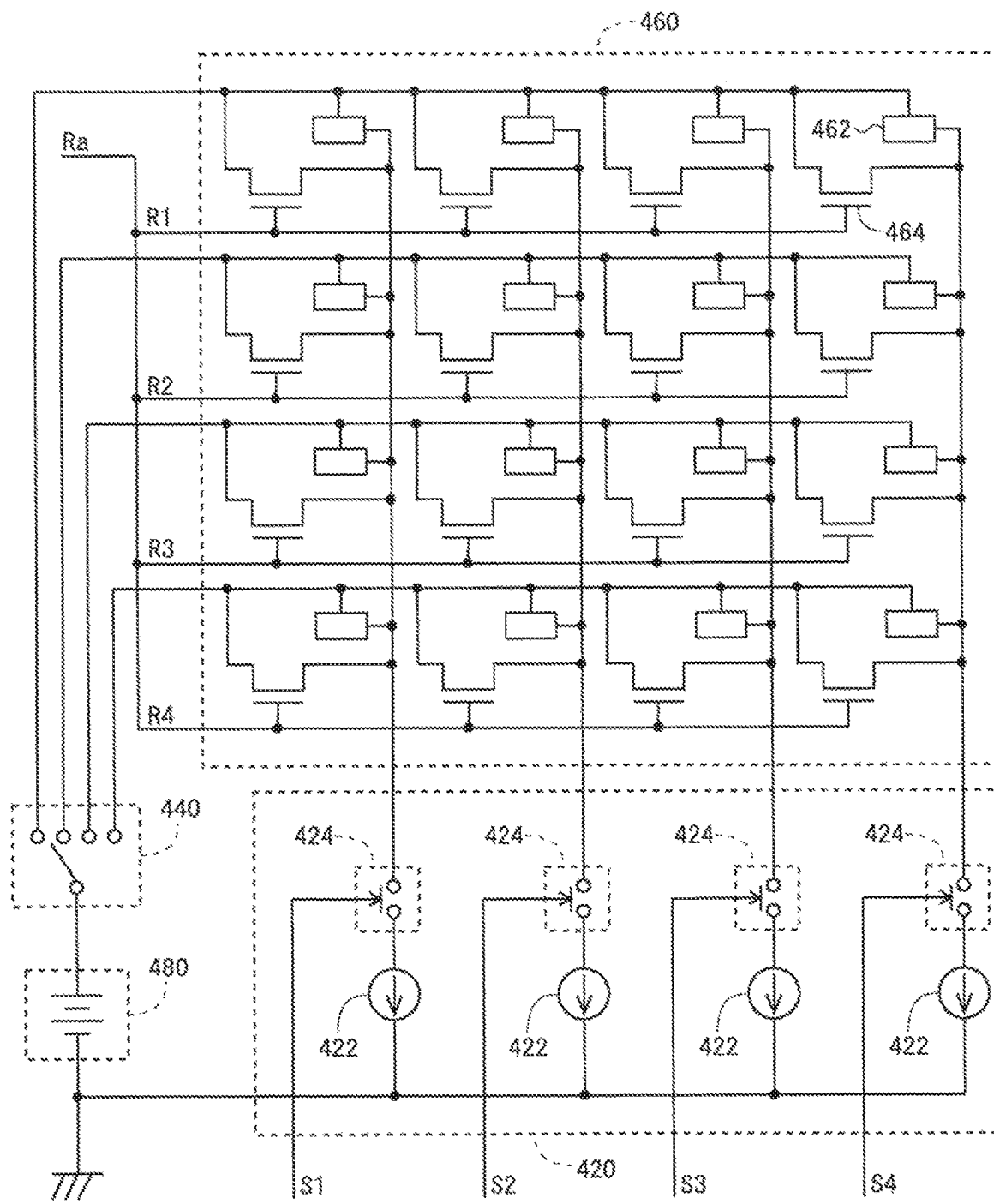
FIG. 20 is a schematic circuit diagram for describing a configuration of a backlight in a variant of the fourth embodiment.

FIG. 20 is a schematic circuit diagram for describing a configuration of a backlight 40 in a variant of the fourth embodiment. In the fourth embodiment, to the illuminating unit 460, different control signals R are supplied for the respective blocks. In contrast, in the present variant, as the control signals R1 to R4, the same signal Ra is supplied to the four blocks BL1 to BL4.

Figure 21:
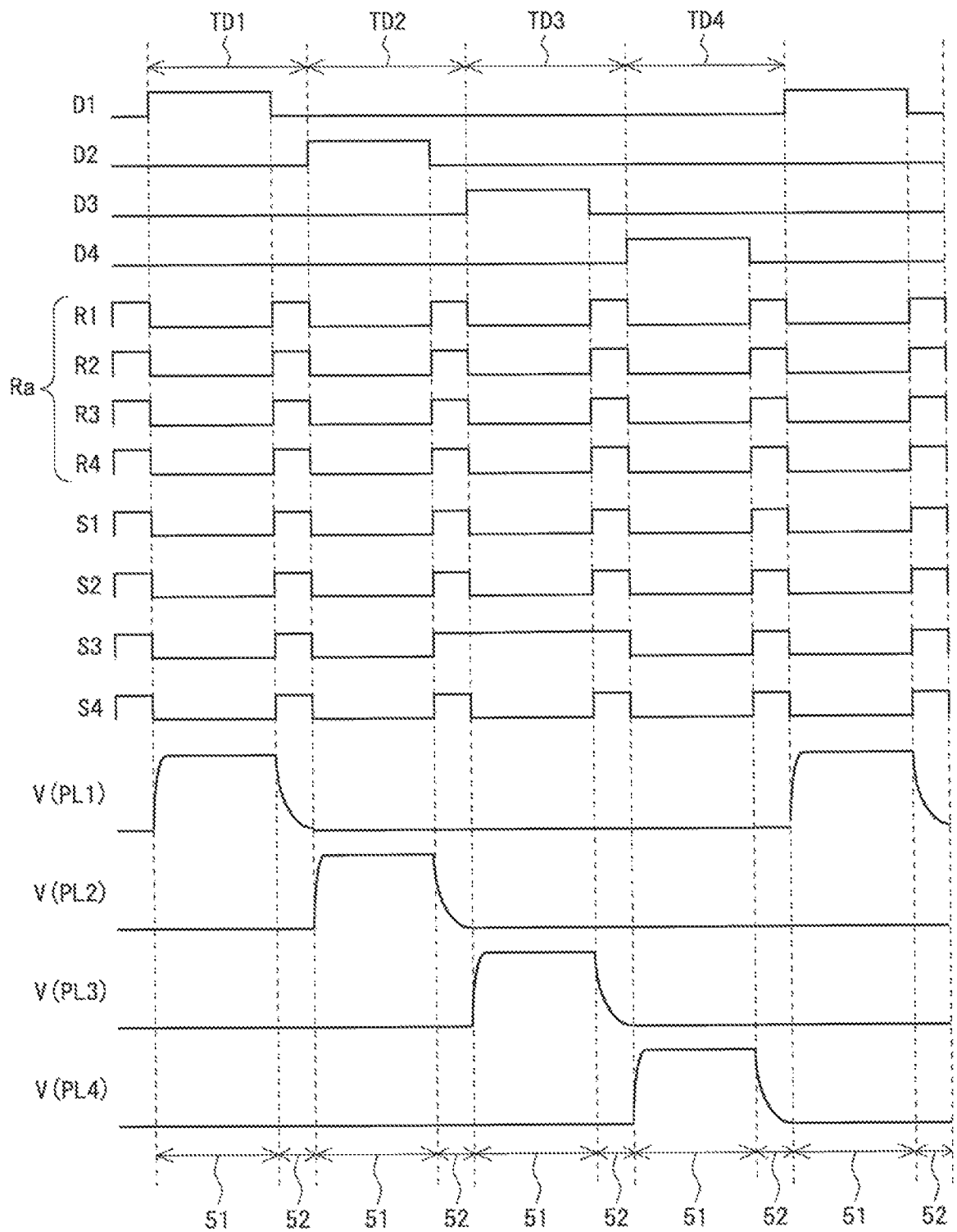
FIG. 21 is a signal waveform diagram for describing a detailed control method regarding turn-on of LEDs in the variant of the fourth embodiment.
Figure 22:
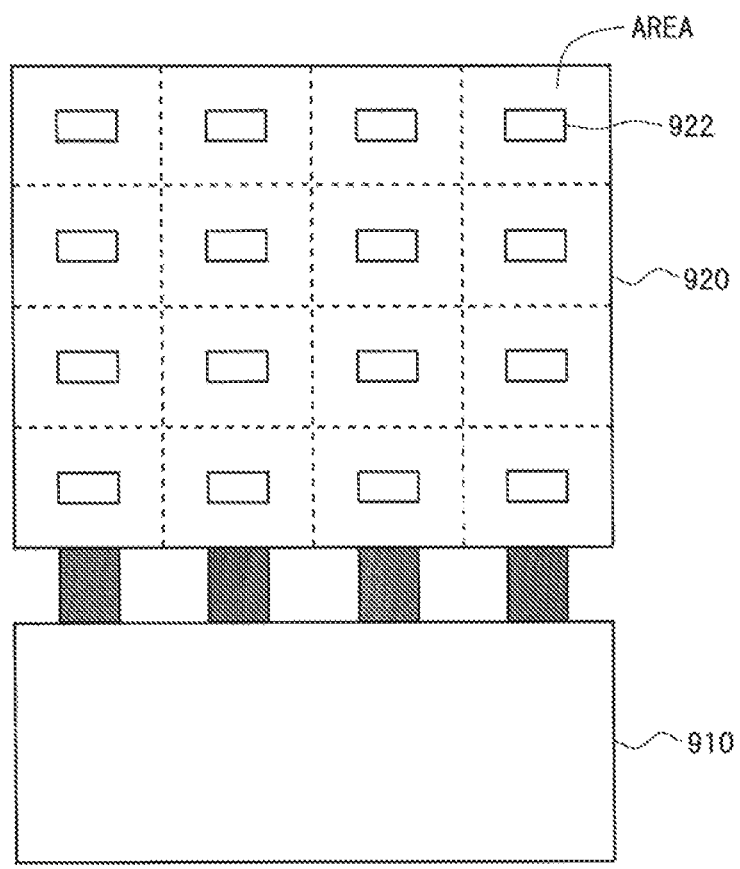
FIG. 22 is a schematic diagram of a direct-type backlight that performs local dimming regarding the conventional example.
Figure 23:
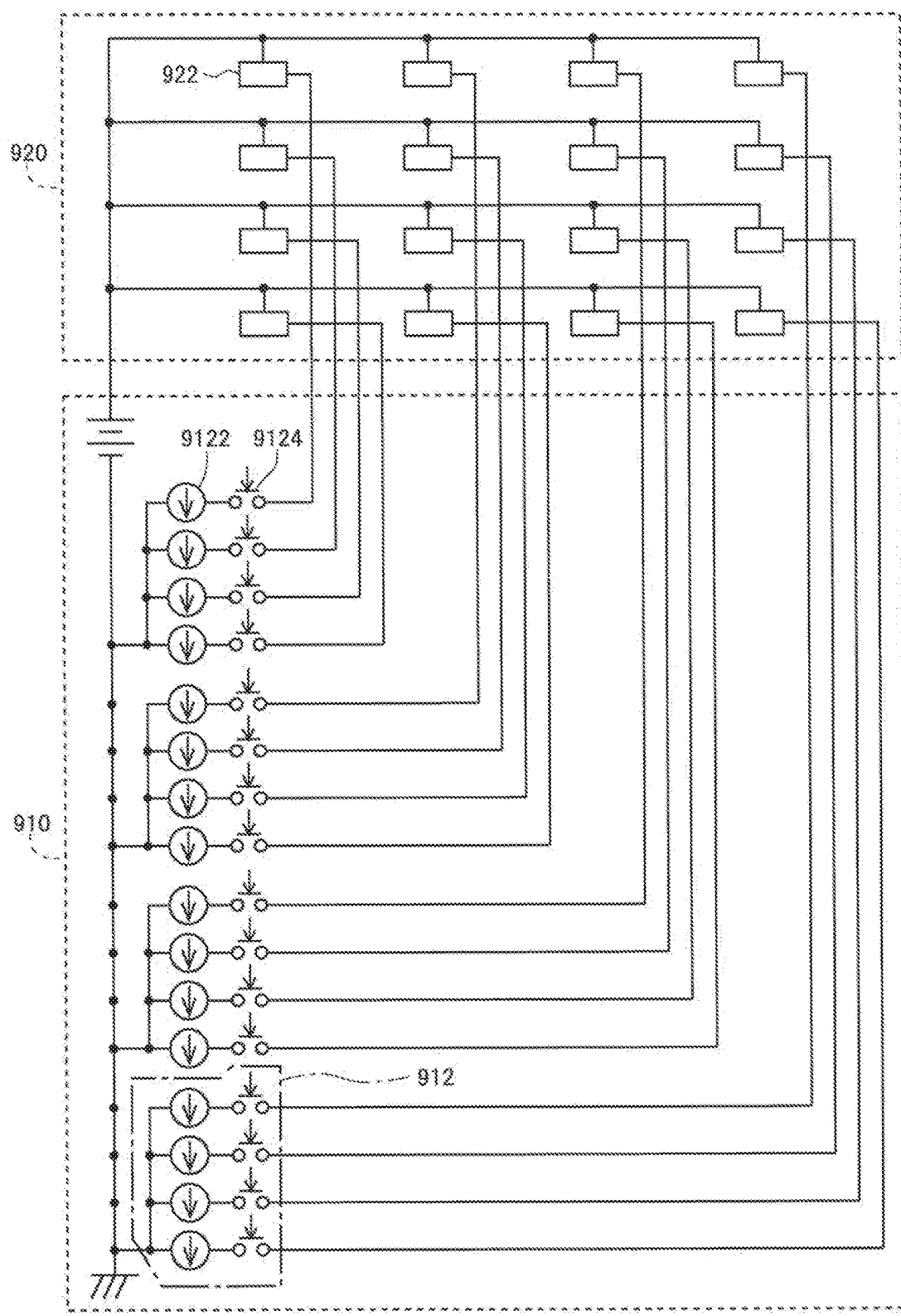
FIG. 23 is a diagram schematically showing a state of wiring lines for a LED driver substrate and an LED substrate regarding the conventional example (a case in which LEDs are individually driven).
Figure 24:
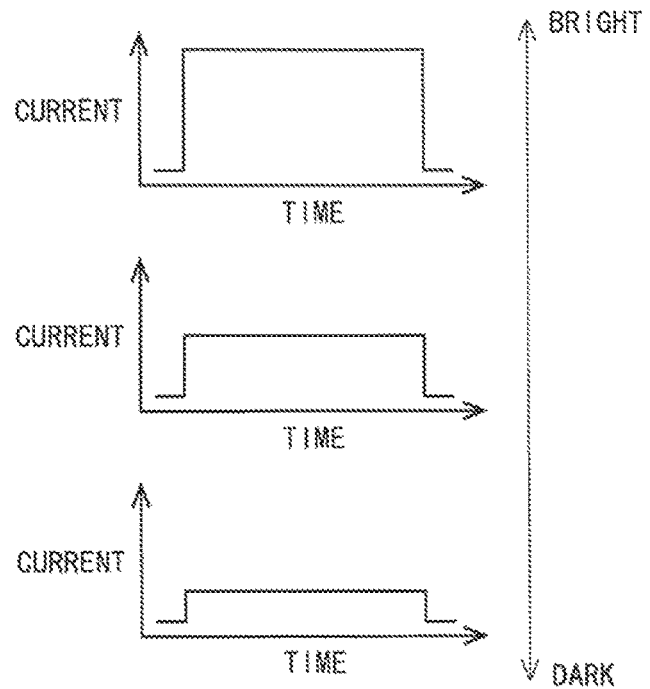
FIG. 24 is a diagram for describing an analog dimming control method regarding a conventional example.
Figure 25:
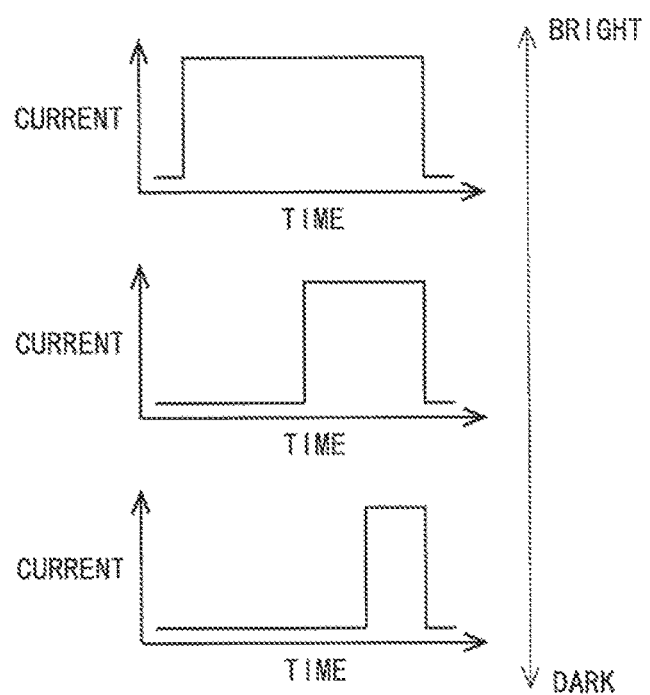
FIG. 25 is a diagram for describing a PWM dimming control method regarding the conventional example.
Figure 26:
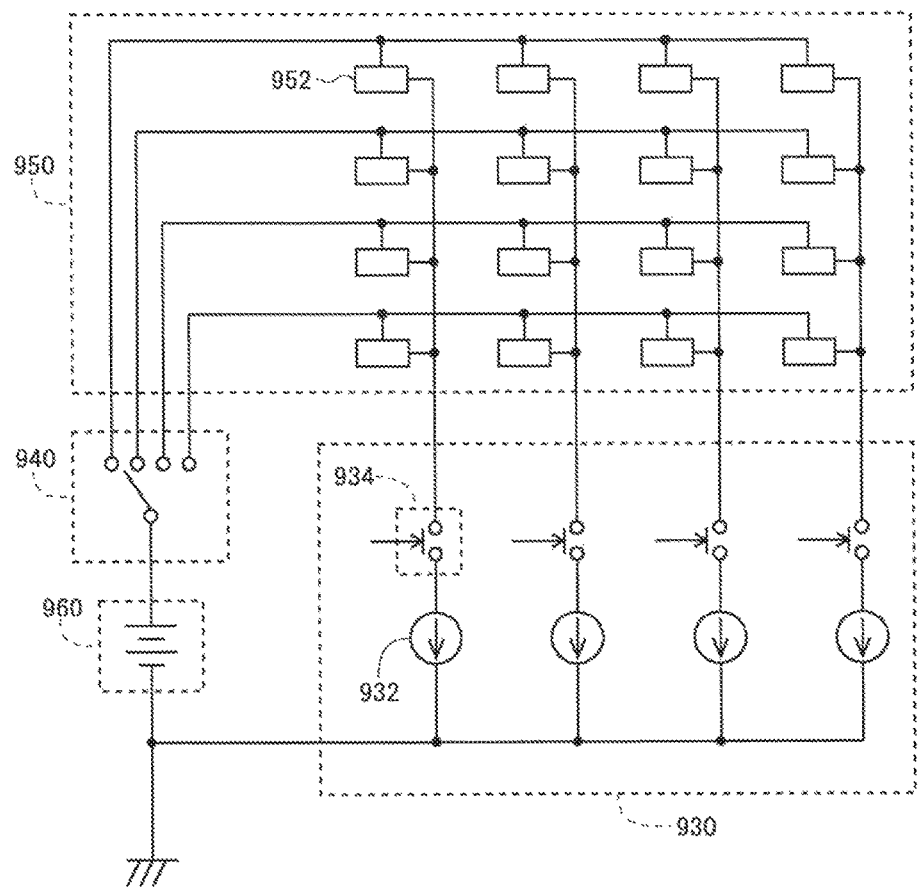
FIG. 26 is a schematic circuit diagram showing a configuration example of a backlight that performs the passive driving regarding the conventional example.
Figure 27:
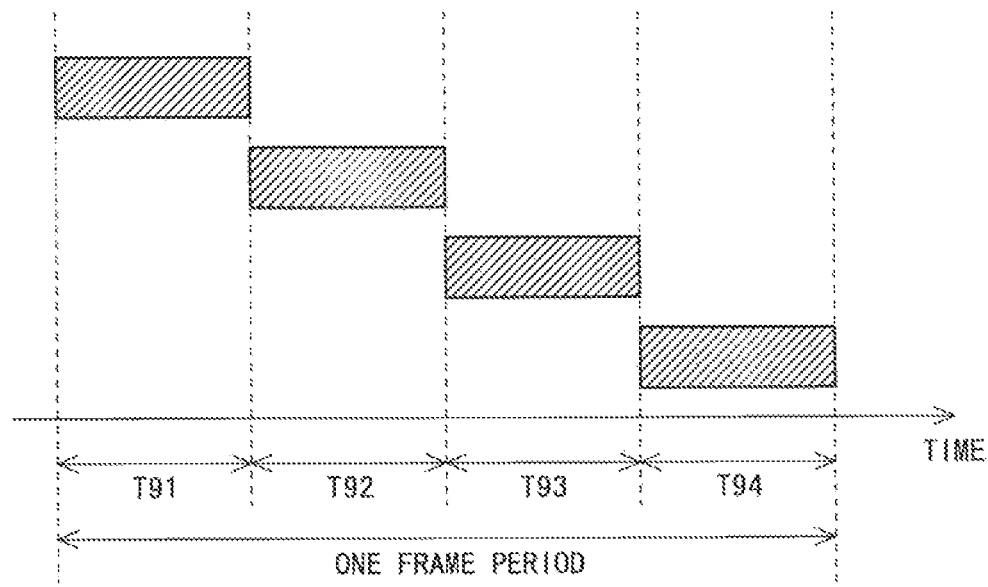
FIG. 27 is a diagram for describing one frame period when performing the passive driving regarding the conventional example.
Figure 28:
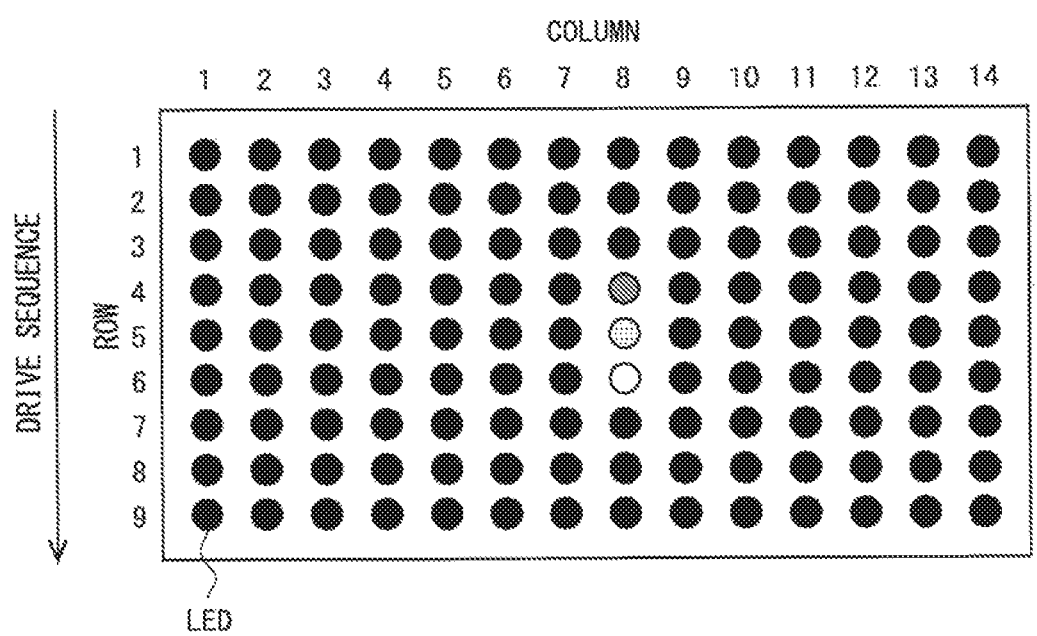
FIG. 28 is a diagram for describing an erroneous lighting regarding the conventional example.
Figure 29:
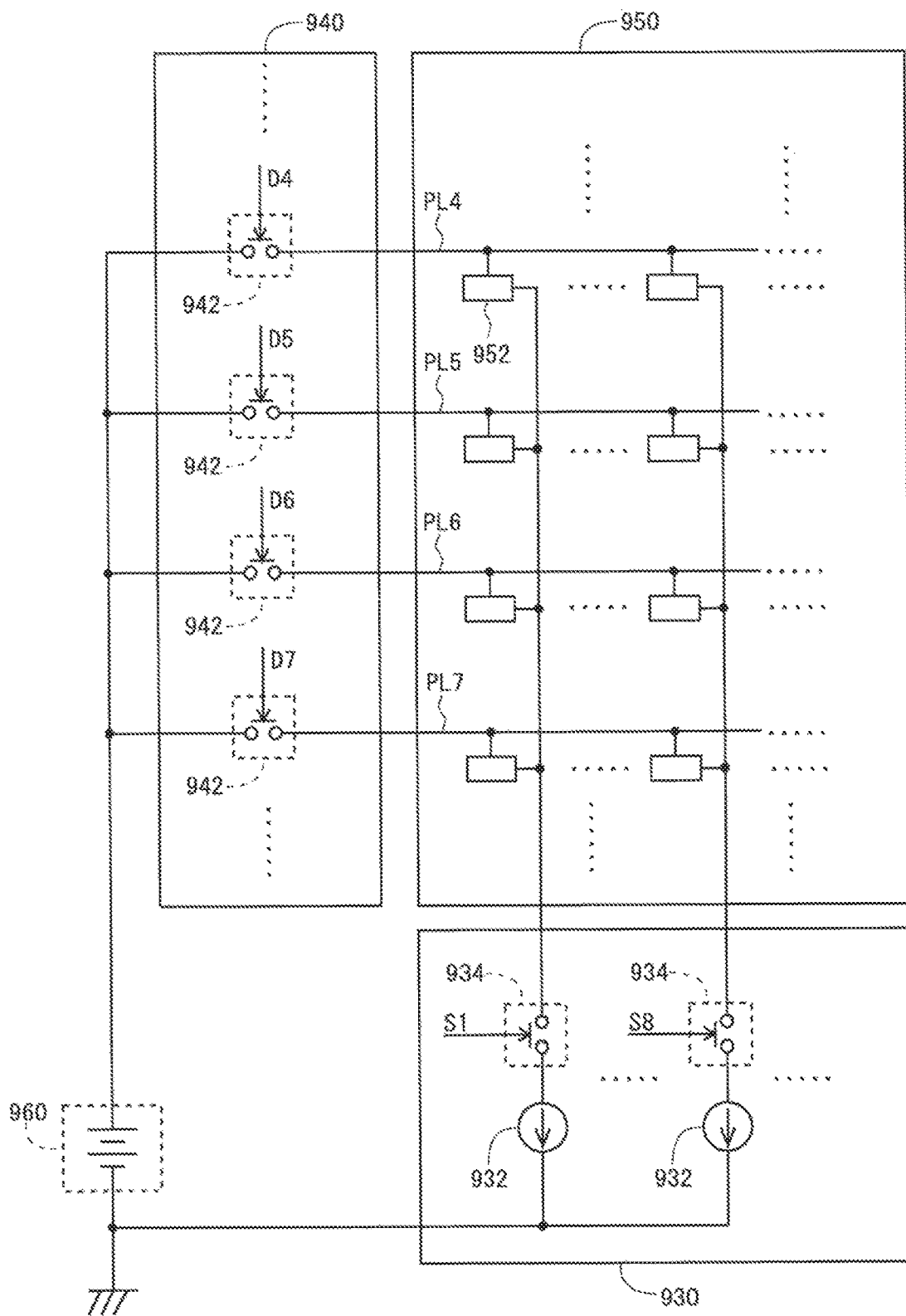
FIG. 29 is a circuit diagram for describing a reason for causing the erroneous lighting regarding the conventional example.
Figure 30:
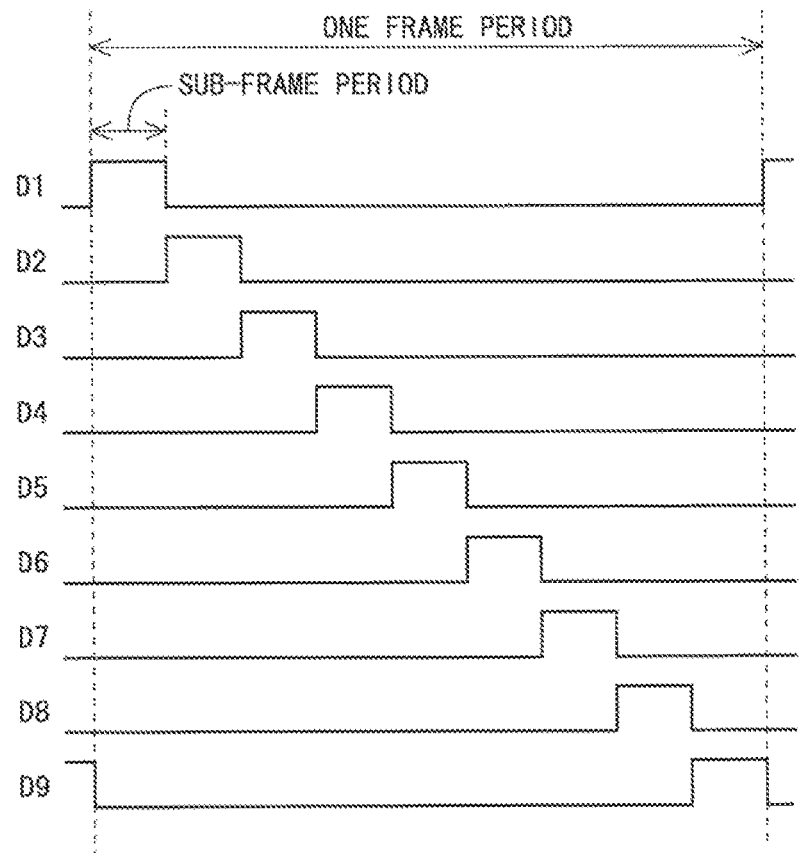
FIG. 30 is a waveform diagram for control signals supplied to switches corresponding to first to ninth rows regarding the conventional example.
Figure 31:
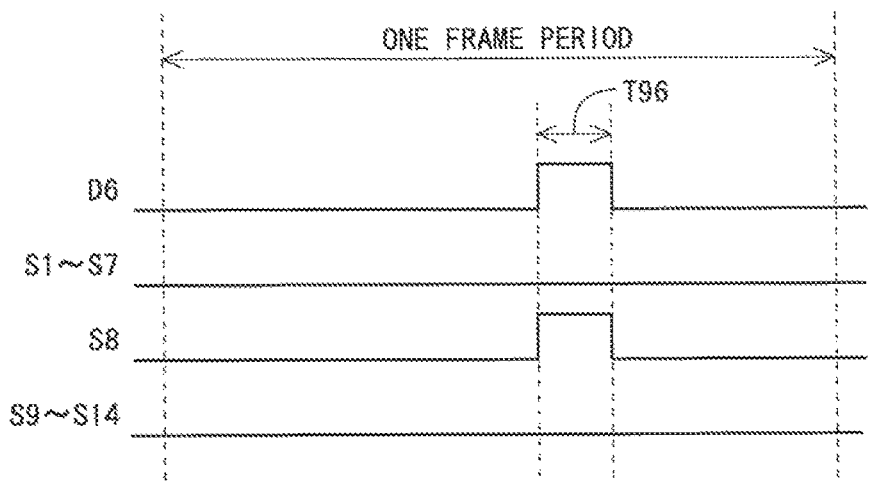
FIG. 31 is a signal waveform diagram for a case in which only an LED of the sixth row and the eighth column is a lighting target regarding the conventional example.
Figure 32:
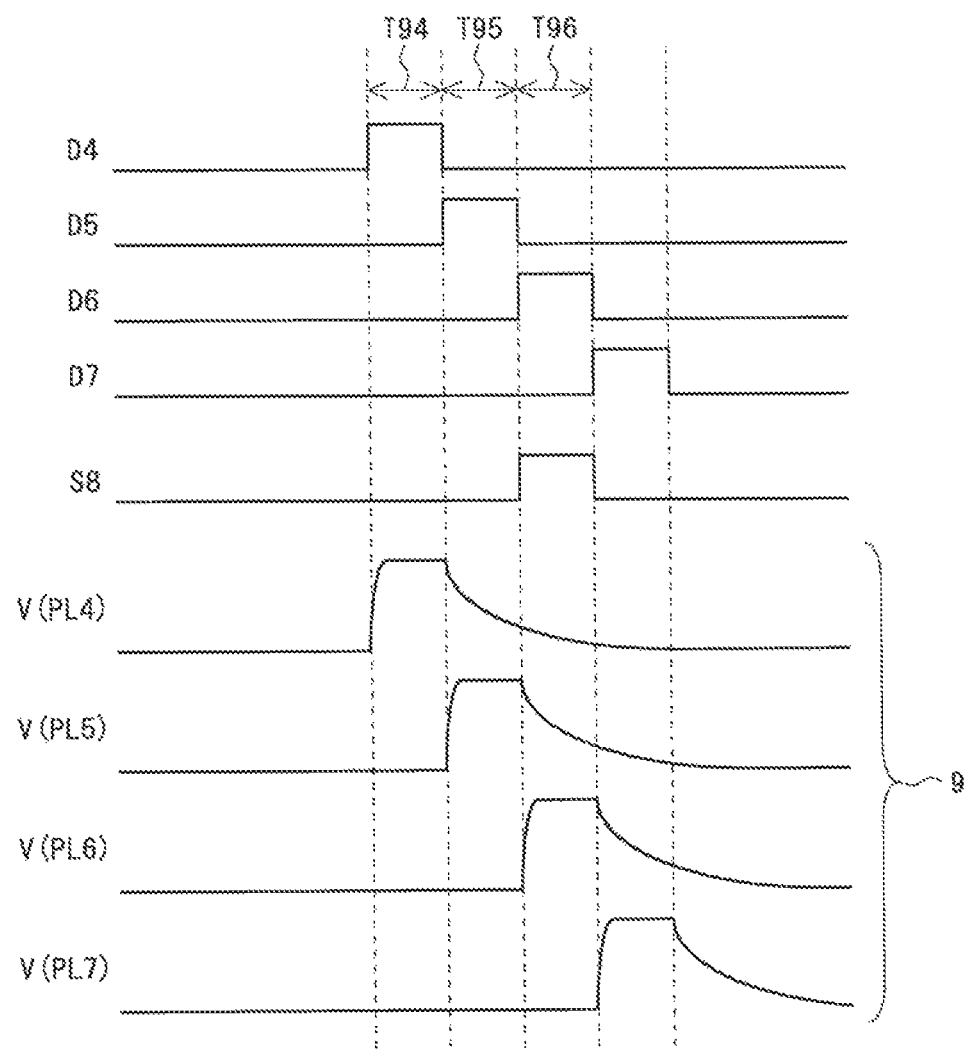
FIG. 32 is an example of a signal waveform diagram for a case in which the erroneous lighting occurs regarding the conventional example.
Figure 33:
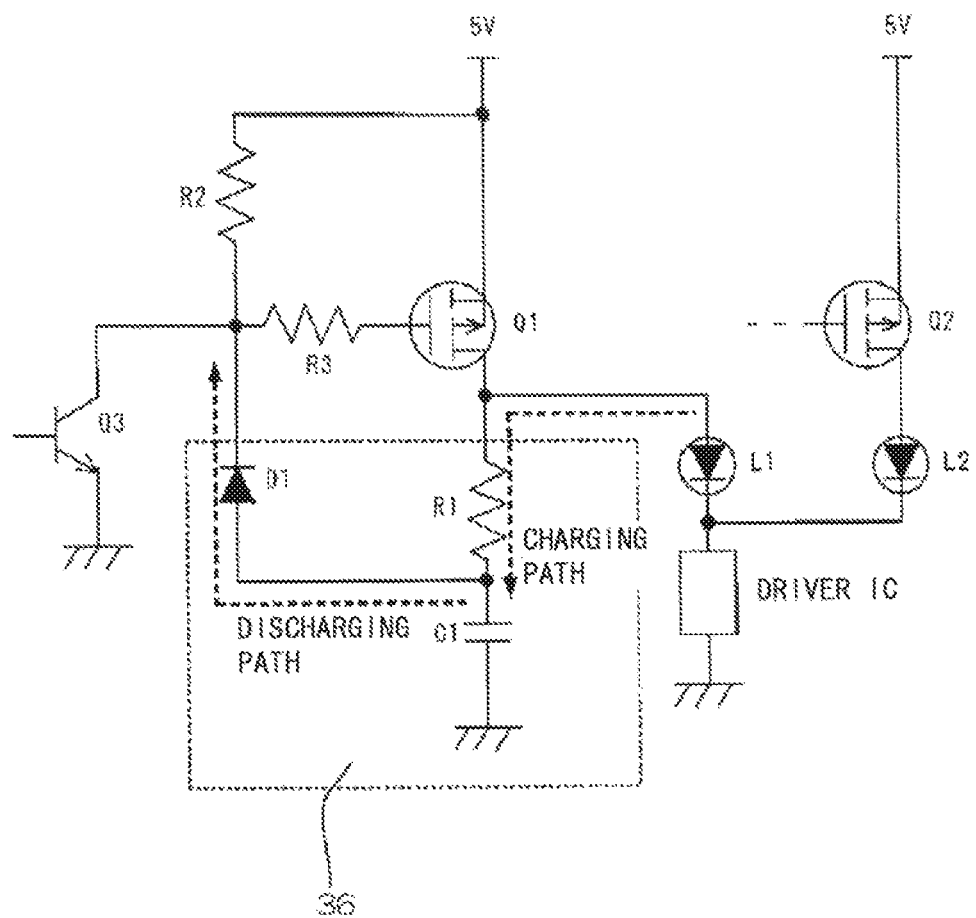
FIG. 33 is FIG. 2 of Japanese Laid-Open Patent Publication No. 2014-46088.
Figure 34:
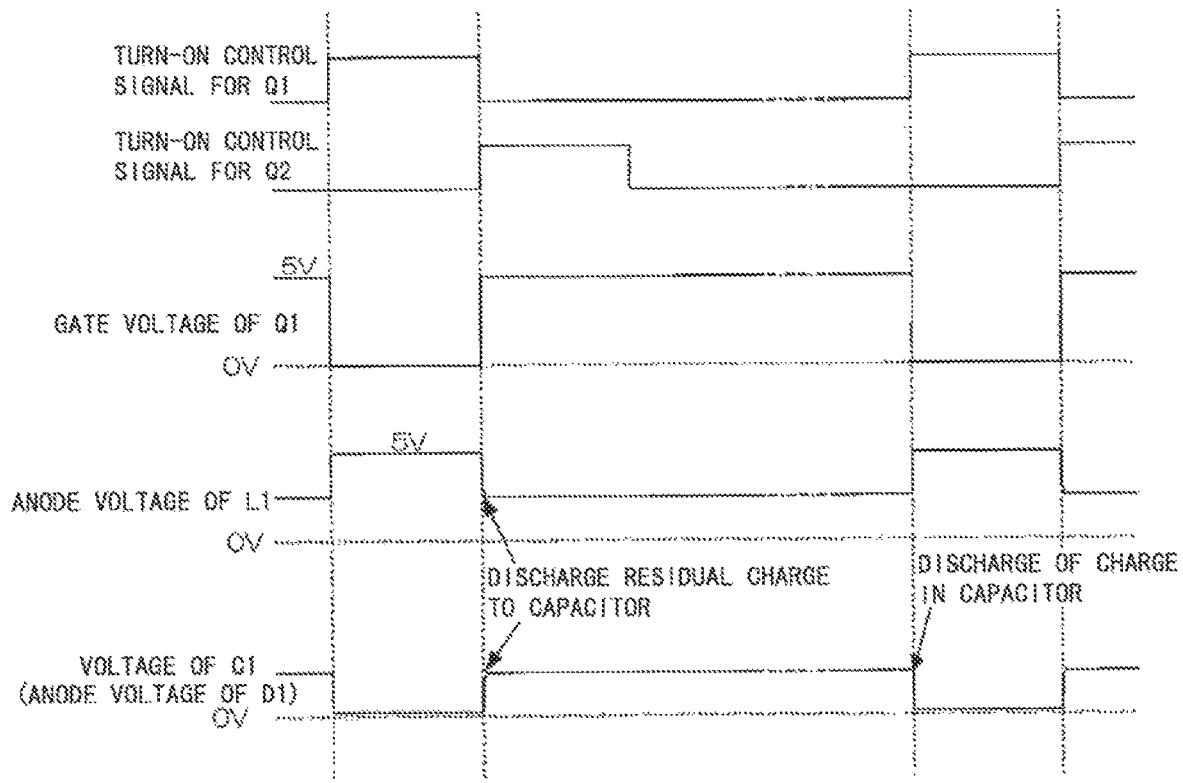
FIG. 34 is FIG. 6 of Japanese Laid-Open Patent Publication No. 2014-46088.

FIG. 21 is a signal waveform diagram for a case in which only an LED 462 of the third row and the third column (an LED 462 of the third column in the third block BL3) emits light with the maximum luminance and all other LEDs 462 do not emit light (a case in which the erroneous lighting occurs according to the conventional technique). In the present variant, as shown in FIG. 21, all control signals R1 to R4 (these are the same signal Ra) are at the high level during each blanking period 52. Namely, all switches 464 in the illuminating unit 460 become the ON state in a period from an end of a period in which the power source voltage VLED is supplied to each block to a start of a period in which the power source voltage VLED is supplied to another block, based on the same signal Ra. As above, in each blanking period 52, electric charge on all power source lines PL1 to PL4 is discharged thorough the switches 464 and the switches 424. Therefore, the erroneous lighting is prevented from occurrence also in the present variant.

According to the present variant, the ON/OFF state of all switches 464 in the illuminating unit 460 is controlled by one signal Ra. Namely, the number of wiring lines can be reduced as compared to the fourth embodiment.

<5. Other>

Although the present invention is described in detail above, the above description is to be considered in all respects as illustrative and not restrictive. It will be understood that many other changes or modifications may be made without departing from the true spirit and scope of the present invention.

What is claimed is:

1. A backlight including LEDs as light sources, the backlight comprising:
   a plurality of LED units divided into a plurality of block, each of the plurality of LED units including one or more LEDs,
   a power supply switching circuit configured to switch a supply destination of a power source voltage for LED driving among the plurality of blocks such that the plurality of LED units are driven on a block-by-block basis,
   a plurality of power source lines for supplying the power source voltage, the plurality of power source lines being provided in one-to-one correspondence with the plurality of blocks, and each of the plurality of power source lines being connected to an upstream end of each of LED units included in a corresponding block,
   an LED drive circuit including the same number of turn-on control switches as LED units included in each block, each of the turn-on control switches being configured to control whether to supply a current to LEDs constituting corresponding LED units, and
   one or more discharge control circuits provided for each block, each of the one or more discharge control circuits being configured to lower a voltage level at the upstream end of each of LED units included in a corresponding block after an end of a period in which the power source voltage is supplied to the corresponding block.

2. The backlight according to claim 1, wherein
   only one discharge control circuit is provided for each block,
   each discharge control circuit includes a discharge control switch having a control terminal to which a first control signal is supplied, a first conduction terminal connected to a corresponding power source line, and a second conduction terminal grounded electrically, and
   the power supply switching circuit includes, for each block, a power source supply control switch having a control terminal to which a second control signal is supplied, a first conduction terminal to which the power source voltage is supplied, and a second conduction terminal connected to a corresponding power source line.

3. The backlight according to claim 2, wherein
   regarding two blocks driven in succession, when a block driven earlier is defined as a preceding block and a block driven later is defined as a succeeding block, the discharge control switch included in a discharge control circuit corresponding to the preceding block becomes an ON state in a period from an end of a period in which the power source voltage is supplied to the preceding block to a start of a period in which the power source voltage is supplied to the succeeding block, based on the first control signal.

4. The backlight according to claim 2, wherein
   a logical inversion signal of the second control signal is supplied as the first control signal to the control terminal of the discharge control switch.

5. The backlight according to claim 1, wherein
   only one discharge control circuit is provided for each block,
   each discharge control circuit includes
      a discharge control switch having a control terminal to which a first control signal is supplied, a first conduction terminal to which the power source voltage is supplied, and a second conduction terminal grounded through a resistor, and
      a diode having an anode connected to a corresponding power source line and a cathode connected to the second conduction terminal of the discharge control switch,
   the power supply switching circuit includes, for each block, a power source supply control switch having a control terminal to which a second control signal is supplied, a first conduction terminal to which the power source voltage is supplied, and a second conduction terminal connected to a corresponding power source line, and
   the first control signal and the second control signal are the same signal.

6. The backlight according to claim 1, wherein
   a plurality of the discharge control circuits are provided in one-to-one correspondence with the plurality of LED units, and
   each discharge control circuit includes a discharge control switch having a control terminal to which a first control signal is supplied, a first conduction terminal connected to a corresponding power source line, and a second conduction terminal connected to a downstream end of a corresponding LED unit.

7. The backlight according to claim 6, wherein
   regarding two blocks driven in succession, when a block driven earlier is defined as a preceding block and a block driven later is defined as a succeeding block, the discharge control switch included in a discharge control circuit corresponding to a LED unit included in the preceding block becomes an ON state in a period from an end of a period in which the power source voltage is supplied to the preceding block to a start of a period in which the power source voltage is supplied to the succeeding block, based on the first control signal.

8. The backlight according to claim 6, wherein
   the same signal is supplied as the first control signal to the control terminal of each of all discharge control switches, and
   the all discharge control switches become an ON state in a period from an end of a period in which the power source voltage is supplied to each block to a start of a period in which the power source voltage is supplied to another block, based on the same signal.

9. A display device comprising:
   a display panel having a display portion configured to display an image, and
   the backlight according to claim 1, the backlight being disposed on a back surface of the display panel so as to emit light to the display portion.

* * * * *